United States Patent
Fees et al.

(10) Patent No.: US 10,381,618 B2
(45) Date of Patent: Aug. 13, 2019

(54) BATTERY MODULE MOUNTING AREA OF AN ENERGY STORAGE SYSTEM

(71) Applicant: InEVit LLC, Redwood City, CA (US)

(72) Inventors: Heiner Fees, Bietigheim-Bissingen (DE); Andreas Track, Sachsenheim (DE); Alexander Eichhorn, Eppingen (DE); Ralf Maisch, Abstatt (DE); Jörg Damaske, Freiberg (DE); Martin Eberhard, Woodside, CA (US); Michael John Miskovsky, San Anselmo, CA (US)

(73) Assignee: InEVit LLC, Santa Clara, CA (US)

( * ) Notice: Subject to any disclaimer, the term of this patent is extended or adjusted under 35 U.S.C. 154(b) by 265 days.

(21) Appl. No.: 15/491,706

(22) Filed: Apr. 19, 2017

(65) Prior Publication Data
US 2018/0108890 A1    Apr. 19, 2018

Related U.S. Application Data

(60) Provisional application No. 62/408,445, filed on Oct. 14, 2016, provisional application No. 62/414,208, (Continued)

(51) Int. Cl.
*H01M 2/00*  (2006.01)
*H01M 2/10*  (2006.01)
(Continued)

(52) U.S. Cl.
CPC .............. *H01M 2/1083* (2013.01); *B60K 1/04* (2013.01); *B60L 50/66* (2019.02);
(Continued)

(58) Field of Classification Search
CPC .............. B60K 1/04; B60K 2001/0494; B60K 2001/0461; H01M 2/206; H01M 2/1094;
(Continued)

(56) References Cited

U.S. PATENT DOCUMENTS 5,981,101 A * 11/1999 Stone ................... H01M 2/1077
                                                  429/100
6,475,659 B1 * 11/2002 Heimer ............... H01M 2/0262
                                                  429/130
(Continued)

FOREIGN PATENT DOCUMENTS

CN          201518328 U      6/2010
CN          105015507 A      11/2015
(Continued)

OTHER PUBLICATIONS

Second Written Opinion dated Jun. 26, 2018 in International Application No. PCT/US2017/056498.
(Continued)

*Primary Examiner* — Cynthia H Kelly
*Assistant Examiner* — Monique M Wills
(74) *Attorney, Agent, or Firm* — Muncy, Geissler, Olds & Lowe, P.C.; Daniel Podhajny

(57) ABSTRACT

An embodiment is directed to a battery module mounting area of an energy storage system. The battery module mounting area includes a first set of battery module compartments arranged along a first longitudinal side of the battery module mounting area, and a second set of battery module compartments arranged along a second longitudinal side of the battery module mounting area. Each battery module compartment in the first and second sets of battery module compartments includes an insertion-side through which a battery module is configured to be inserted into the battery module compartment and/or removed from the battery module compartment. The insertion-side of each battery module compartment in the first and second sets of battery module compartments is configured to be closed via an insertion-side cover to form a battery housing with a closed compartment profile that is characterized by each battery (Continued)

module compartment being sealed from at least one other battery module compartment in the battery housing.

26 Claims, 21 Drawing Sheets

Related U.S. Application Data filed on Oct. 28, 2016, provisional application No. 62/422,090, filed on Nov. 15, 2016, provisional application No. 62/422,106, filed on Nov. 15, 2016, provisional application No. 62/422,115, filed on Nov. 15, 2016.

(51) Int. Cl.
| | |
|---|---|
| *B60K 1/04* | (2019.01) |
| *H01M 2/20* | (2006.01) |
| *H01M 10/0525* | (2010.01) |
| *B60L 50/60* | (2019.01) |
| *B60K 6/28* | (2007.10) |
| *H01M 2/12* | (2006.01) |
| *H01M 10/625* | (2014.01) |
| *H01M 10/613* | (2014.01) |

(52) U.S. Cl.
CPC ....... *H01M 2/1072* (2013.01); *H01M 2/1077* (2013.01); *H01M 2/1094* (2013.01); *H01M 2/206* (2013.01); *H01M 10/0525* (2013.01); *B60K 6/28* (2013.01); *B60K 2001/0438* (2013.01); *B60K 2001/0461* (2013.01); *B60K 2001/0466* (2013.01); *B60K 2001/0472* (2013.01); *B60K 2001/0488* (2013.01); *B60K 2001/0494* (2013.01); *B60Y 2200/91* (2013.01); *B60Y 2200/92* (2013.01); *H01M 2/127* (2013.01); *H01M 10/613* (2015.04); *H01M 10/625* (2015.04); *H01M 2220/20* (2013.01); *Y10S 903/907* (2013.01)

(58) Field of Classification Search
CPC ............. H01M 2/1083; Y10S 903/907; B60Y 2200/91; B60L 11/1877
See application file for complete search history.

(56) References Cited

U.S. PATENT DOCUMENTS

| | | |
|---|---|---|
| 2007/0087266 A1 | 4/2007 | Bourke et al. |
| 2007/0188147 A1 | 8/2007 | Straubel et al. |
| 2012/0129024 A1 | 5/2012 | Marchio et al. |
| 2012/0161472 A1 | 6/2012 | Rawlinson et al. |
| 2012/0237803 A1 | 9/2012 | Mardall et al. |
| 2013/0029198 A1* | 1/2013 | Suzuki ............... H01M 2/1077 429/82 |
| 2013/0196205 A1* | 8/2013 | Silk .................... H01M 2/0245 429/99 |
| 2014/0284125 A1 | 9/2014 | Katayama et al. |

FOREIGN PATENT DOCUMENTS

| | | |
|---|---|---|
| DE | 102008036595 | 2/2010 |
| DE | 102012219782 A1 | 4/2014 |
| EP | 000002463162 | 3/2016 |
| EP | 3073546 A1 | 9/2016 |
| EP | 2760063 A1 | 4/2017 |
| JP | 2016004772 A | 1/2016 |
| WO | 2009158674 A2 | 12/2009 |

OTHER PUBLICATIONS

MoteurNature "SIM-Drive, after the incredible Eliica, the latest project of the brilliant Hiroshi Shimizu", Retrieved from Internet on Apr. 25, 2017, http://www.moteurnature.com/actu/2009/SIM-Drive-electrique.php, pp. 1-4.

Carbike GmbH 2016 "Accuturing station", Retrieved from Internet on Apr. 12, 2017, http://www.carbike.de/carbike_de_akkutankstelle.html, pp. 1.

International Search Report and Written Opinion dated Dec. 8, 2017 in International Application No. PCT/US2017/056482.

\* cited by examiner

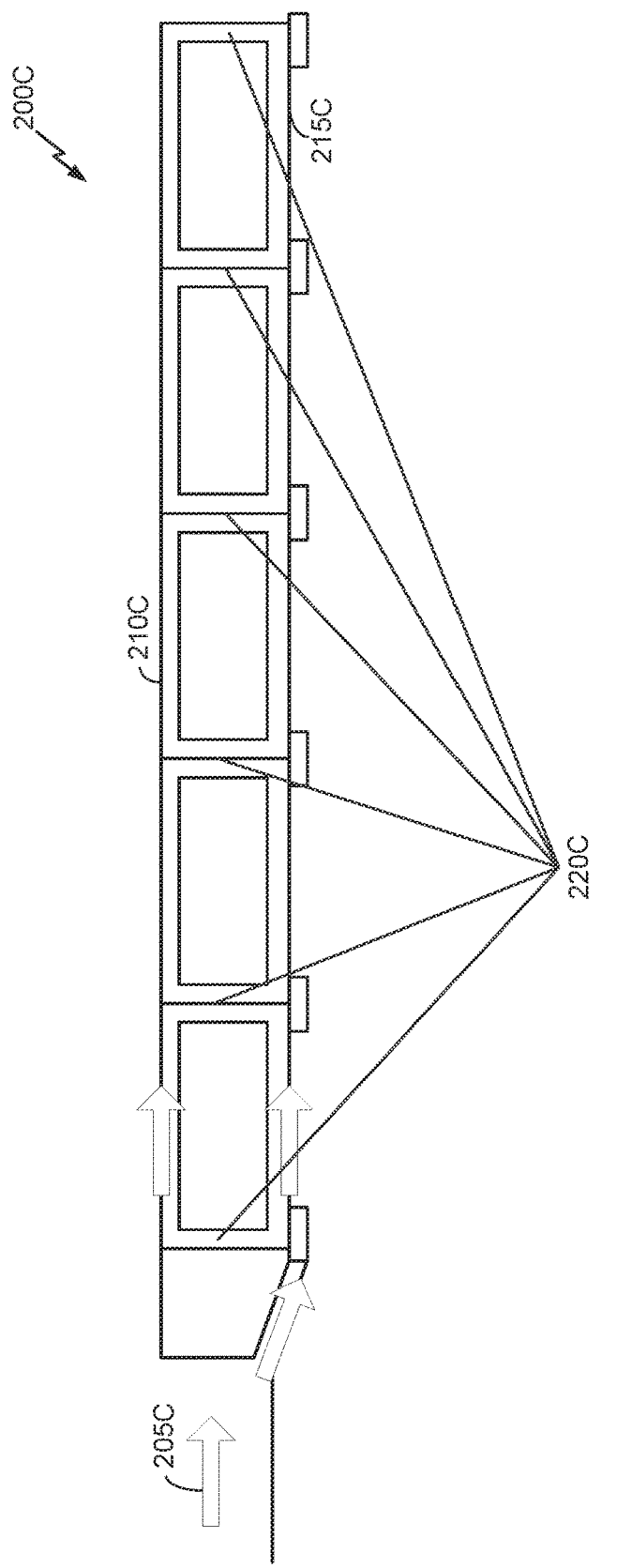

BATTERY MODULE MOUNTING AREA OF AN ENERGY STORAGE SYSTEM

CROSS-REFERENCE TO RELATED APPLICATIONS

The present Application for Patent claims the benefit of U.S. Provisional Application No. 62/408,445, entitled "CAR FLOOR SYSTEM WITH INTEGRATED BATTERY MODULES", filed Oct. 14, 2016, and also to U.S. Provisional Application No. 62/414,208, entitled "CAR FLOOR SYSTEM WITH INTEGRATED BATTERY MODULES", filed Oct. 28, 2016, and also to U.S. Provisional Application No. 62/422,090, entitled "CAR FLOOR SYSTEM WITH INTEGRATED BATTERY MODULES", filed Nov. 15, 2016, each of which is by the same inventors as the subject application, assigned to the assignee hereof and hereby expressly incorporated by reference herein in its entirety.

BACKGROUND

1. Field of the Disclosure

Embodiments relate to a battery module mounting area of an energy storage system.

2. Description of the Related Art

Energy storage systems may rely upon batteries for storage of electrical power. For example, in certain conventional electric vehicle (EV) designs (e.g., fully electric vehicles, hybrid electric vehicles, etc.), a battery housing mounted into an electric vehicle houses a plurality of battery cells (e.g., which may be individually mounted into the battery housing, or alternatively may be grouped within respective battery modules that each contain a set of battery cells, with the respective battery modules being mounted into the battery housing). The battery modules in the battery housing are connected to a battery junction box (BJB) via busbars, which distribute electric power to an electric motor that drives the electric vehicle, as well as various other electrical components of the electric vehicle (e.g., a radio, a control console, a vehicle Heating, Ventilation and Air Conditioning (HVAC) system, internal lights, external lights such as head lights and brake lights, etc.).

SUMMARY

An embodiment is directed to a battery module mounting area of an energy storage system. The battery module mounting area includes a first set of battery module compartments arranged along a first longitudinal side of the battery module mounting area, and a second set of battery module compartments arranged along a second longitudinal side of the battery module mounting area. Each battery module compartment in the first and second sets of battery module compartments includes an insertion-side through which a battery module is configured to be inserted into the battery module compartment and/or removed from the battery module compartment. The insertion-side of each battery module compartment in the first and second sets of battery module compartments is configured to be closed via an insertion-side cover to form a battery housing with a closed compartment profile that is characterized by each battery module compartment being sealed from at least one other battery module compartment in the battery housing.

BRIEF DESCRIPTION OF THE DRAWINGS

A more complete appreciation of embodiments of the disclosure will be readily obtained as the same becomes better understood by reference to the following detailed description when considered in connection with the accompanying drawings, which are presented solely for illustration and not limitation of the disclosure, and in which:

FIG. 2C illustrates an impact distribution through the battery housing of the electric vehicle from a left side-perspective in accordance with an embodiment of the disclosure.

DETAILED DESCRIPTION

Embodiments of the disclosure are provided in the following description and related drawings. Alternate embodiments may be devised without departing from the scope of the disclosure. Additionally, well-known elements of the disclosure will not be described in detail or will be omitted so as not to obscure the relevant details of the disclosure.

Energy storage systems may rely upon batteries for storage of electrical power. For example, in certain conventional electric vehicle (EV) designs (e.g., fully electric vehicles, hybrid electric vehicles, etc.), a battery housing mounted into an electric vehicle houses a plurality of battery cells (e.g., which may be individually mounted into the battery housing, or alternatively may be grouped within respective battery modules that each contain a set of battery cells, with the respective battery modules being mounted into the battery housing). The battery modules in the battery housing are connected to a battery junction box (BJB) via busbars, which distribute electric power to an electric motor that drives the electric vehicle, as well as various other electrical components of the electric vehicle (e.g., a radio, a control console, a vehicle Heating, Ventilation and Air Conditioning (HVAC) system, internal lights, external lights such as head lights and brake lights, etc.).

Figure 1A:
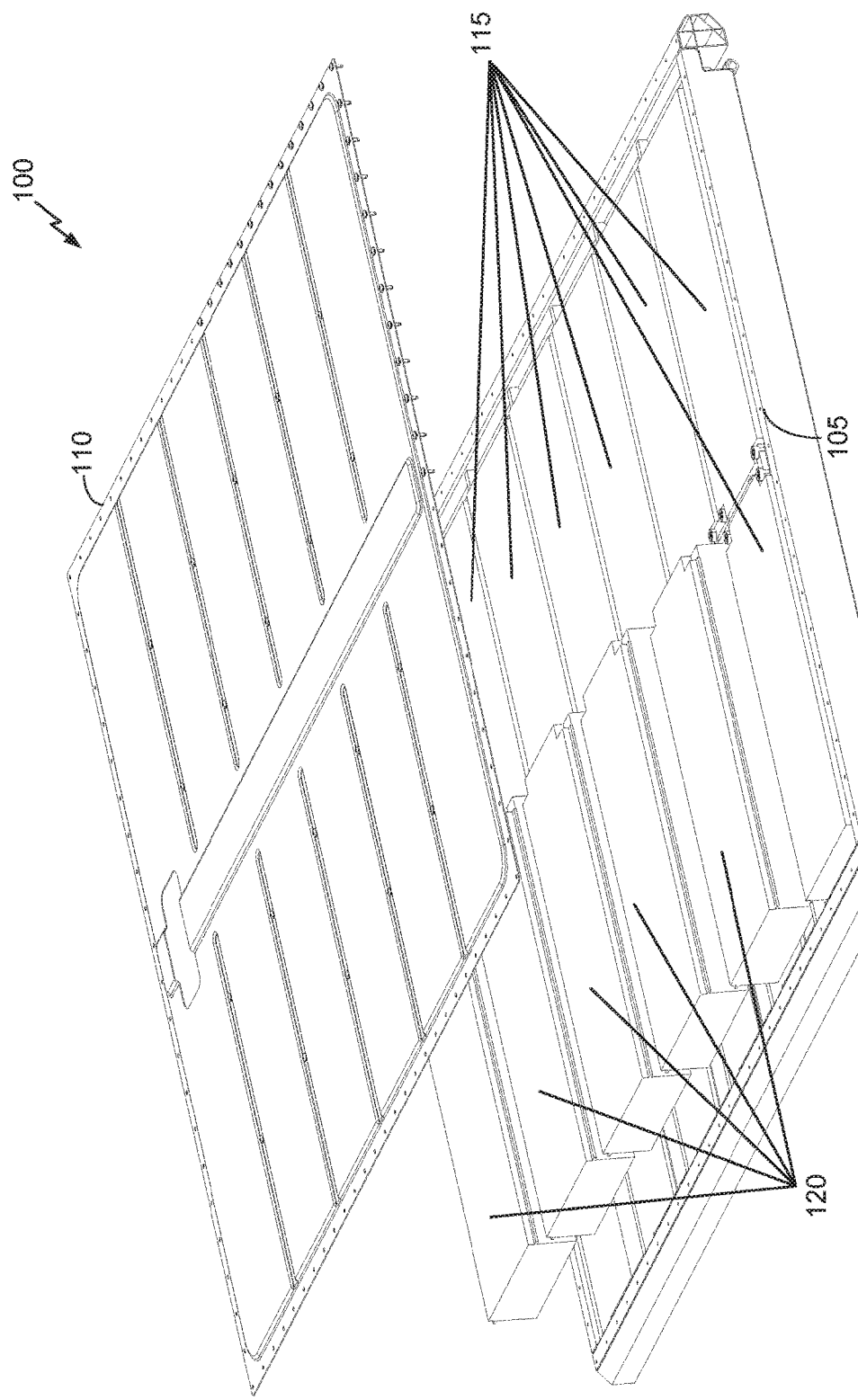
FIGS. 1A-1B illustrate different perspectives of one particular example of a battery housing for a conventional electric vehicle.
Figure 1B:
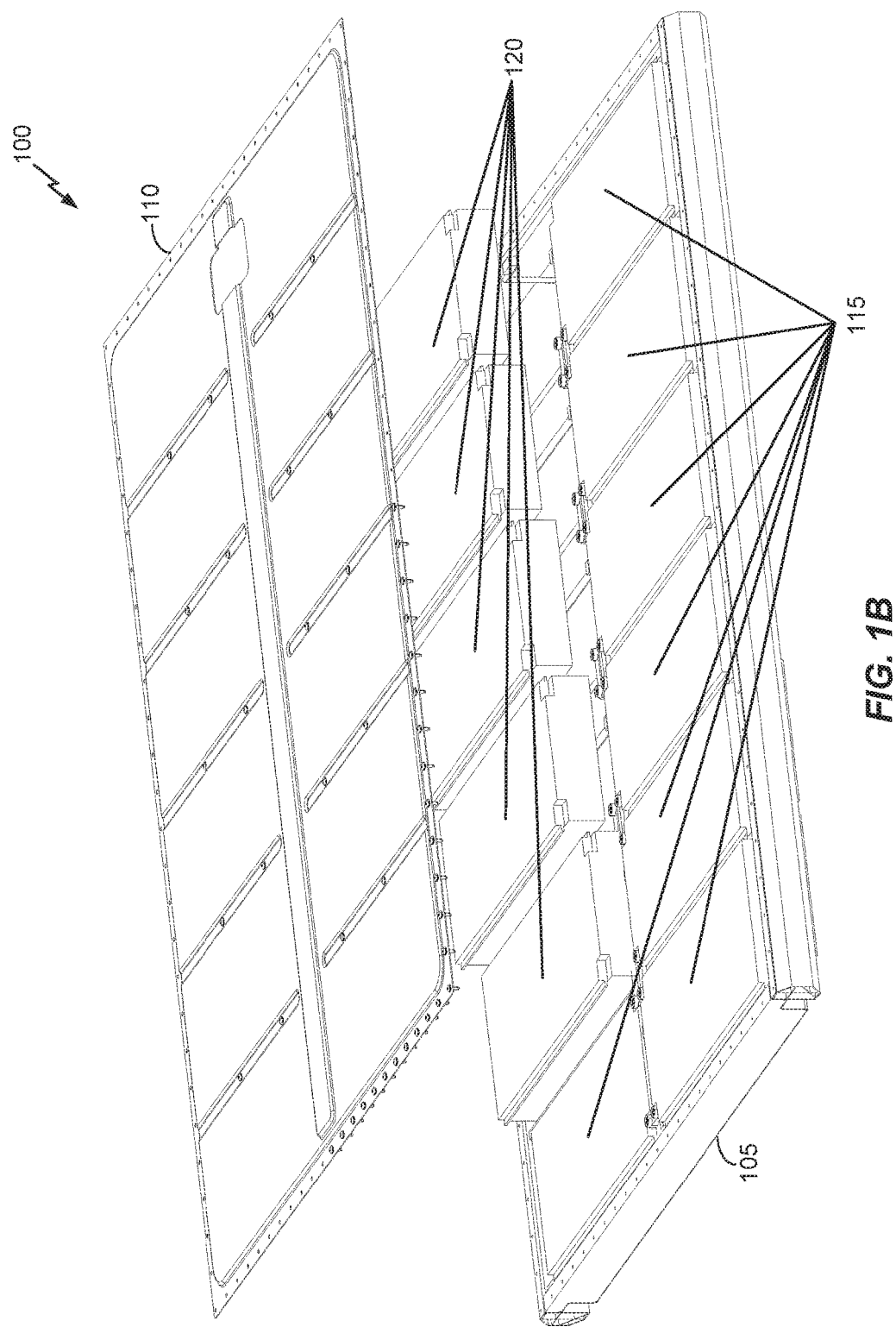

FIGS. 1A-1B illustrate different perspectives of one particular example of a battery housing 100 for a conventional electric vehicle. As used herein, the orientation of particular components illustrated in FIGS. 1A-1B (as well as other FIGS) are described with respect to X, Y and Z axes (or directions). The X axis (or direction) is longitudinal and runs lengthwise along the electric vehicle (e.g., from a front of the electric vehicle to a rear of the electric vehicle, or vice versa). The Y axis (or direction) is lateral and runs widthwise along the electric vehicle (e.g., from a right side of the electric vehicle to a left side of the electric vehicle, or vice versa). The Z axis (or direction) runs vertically along the electric vehicle (e.g., from a top of the electric vehicle to a bottom of the electric vehicle, or vice versa)

Referring to FIGS. 1A-1B, the battery housing 100 includes a battery module mounting area 105 and a top-cover 110. The battery module mounting area 105 may be physically located underneath a floor of the electric vehicle (e.g., attached with bolts, etc., to become a removably attached portion of a structural frame or chassis of the electric vehicle). The battery module mounting area 105 includes a number of slots into which battery modules may be inserted or installed vertically (i.e., along the Z axis/direction), with each installed battery module configured to connect to one or more busbars (not shown) through which power may be exchanged. As will be appreciated, the battery module mounting area 105 has a "bath tub" design in the sense that a single, wide top-opening is the only area through which battery modules can be inserted into a recessed area and/or removed from the recessed area. In FIGS. 1A-1B, battery modules 115 are shown within the battery module mounting area 105 in an inserted or installed-state, while battery modules 120 are shown at various degrees of insertion. In particular, the sidewalls of the battery module mounting area 105 are fixed, and the depiction of the battery modules 120 shows that the battery modules 115-120 are inserted into the battery module mounting area 105 via a top-opening while the top-cover 110 is not secured.

Figure 1C:
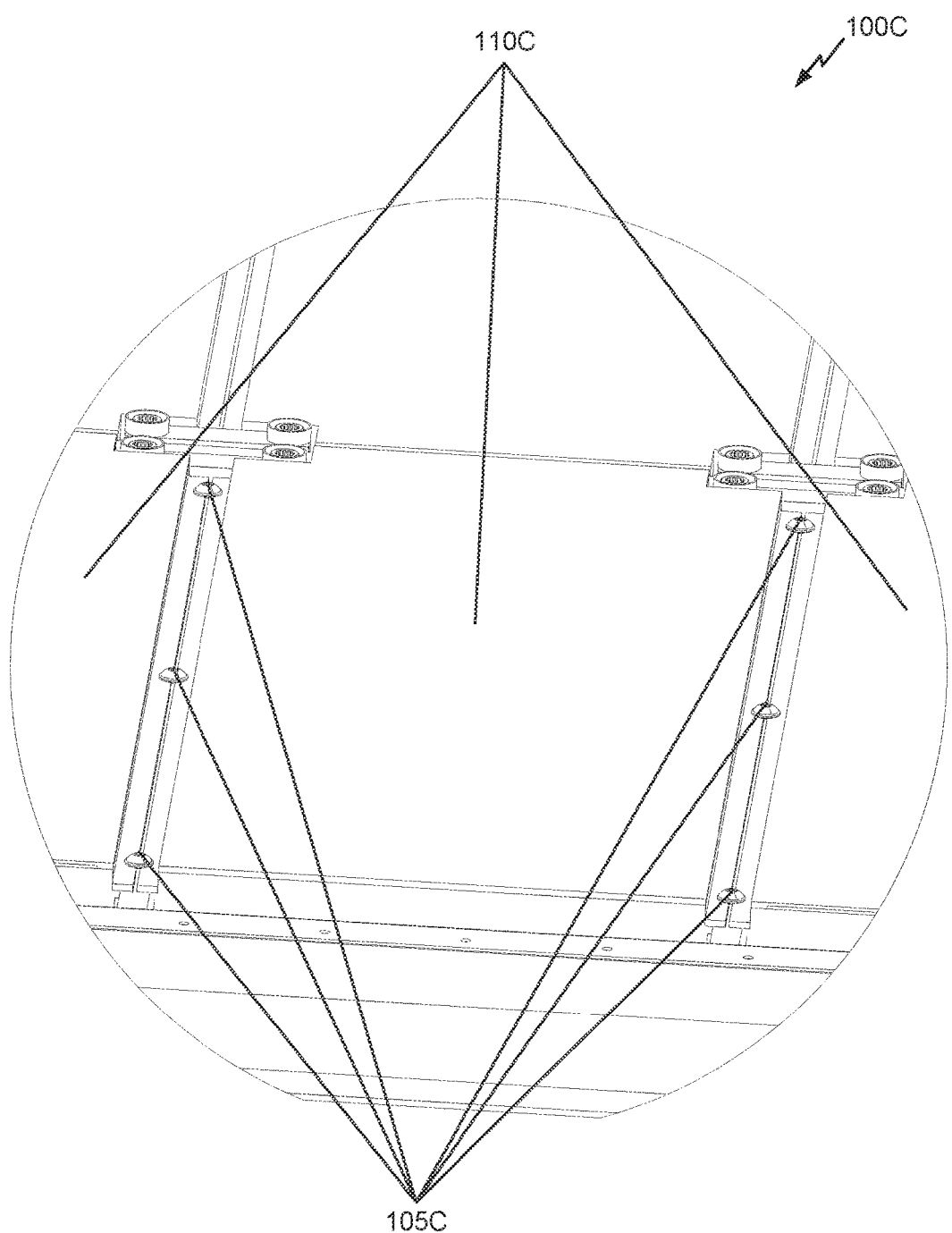
FIG. 1C illustrates a portion of the battery housing of FIGS. 1A-1B, which shows bolts that are screwed into a top-cover between adjacent battery modules in order to secure the battery housing.

While not shown explicitly in FIGS. 1A-1B, after all of the battery modules 115-120 are inserted into the battery module mounting area 105, the top-cover 110 may be secured onto the battery module mounting area 105 (e.g., via bolts, etc.) to form the battery housing 100 (or trough). FIG. 1C illustrates a portion 100C of the battery housing 100, which shows bolts 105C that are screwed into the top-cover 110 between adjacent battery modules 110C in order to secure the battery housing 100.

Referring to FIGS. 1A-1C, while not shown explicitly, high-voltage (HV) and low-voltage (LV) busbars that connect to the battery modules 115-120 may be distributed across the whole battery housing 100, which consumes significant physical space, and it may be difficult to realize the required cross section to carry current without excess power loss. Further, the battery module mounting area 105 may be made from extruded or die-cast aluminum, or sheet metal. The top-cover 110 (e.g., which may be made out of plastic or thin sheet metal) is intended to protect and seal the battery housing 100 from various external environmental factors such as liquids (e.g., if a passenger drops his/her beverage, the top-cover 110 will help to limit any leakage from seeping into the battery housing 100). However, it may be difficult for a single battery housing-wide top-cover, such as top-cover 110, to compensate for all the tolerances of production and also for deformations during vehicle operation. For example, there is no hard joint connection between the top-cover 110 (e.g., typically made from thin sheet metal or plastic) and the battery housing 100 over the whole contact zone, such that the top-cover 110 will generally buckle easily in response to a crash impact.

Further, referring to FIGS. 1A-1C, while the battery housing 100 is sealed from the external environment when the top-cover 110 is secured, the individual battery modules are not sealed off from each other within the battery housing 100, such that a hazardous condition at one battery module (e.g., a cell rupture or leak, excessive heat or fire, etc.) may propagate to adjacent battery modules within the battery housing 100. The lack of an effective seal between the individual battery modules within the battery housing 100 may be caused by various factors, including the battery housing-wide distribution of busbars and the use of a single top-cover 110 for the entire battery housing 100 as described above with respect to FIGS. 1A-1C. Also, in the case of cell venting, the outgoing gas and inner cell material may spread to other battery modules so as to contaminate other battery modules in the battery housing 100.

Figure 2A:
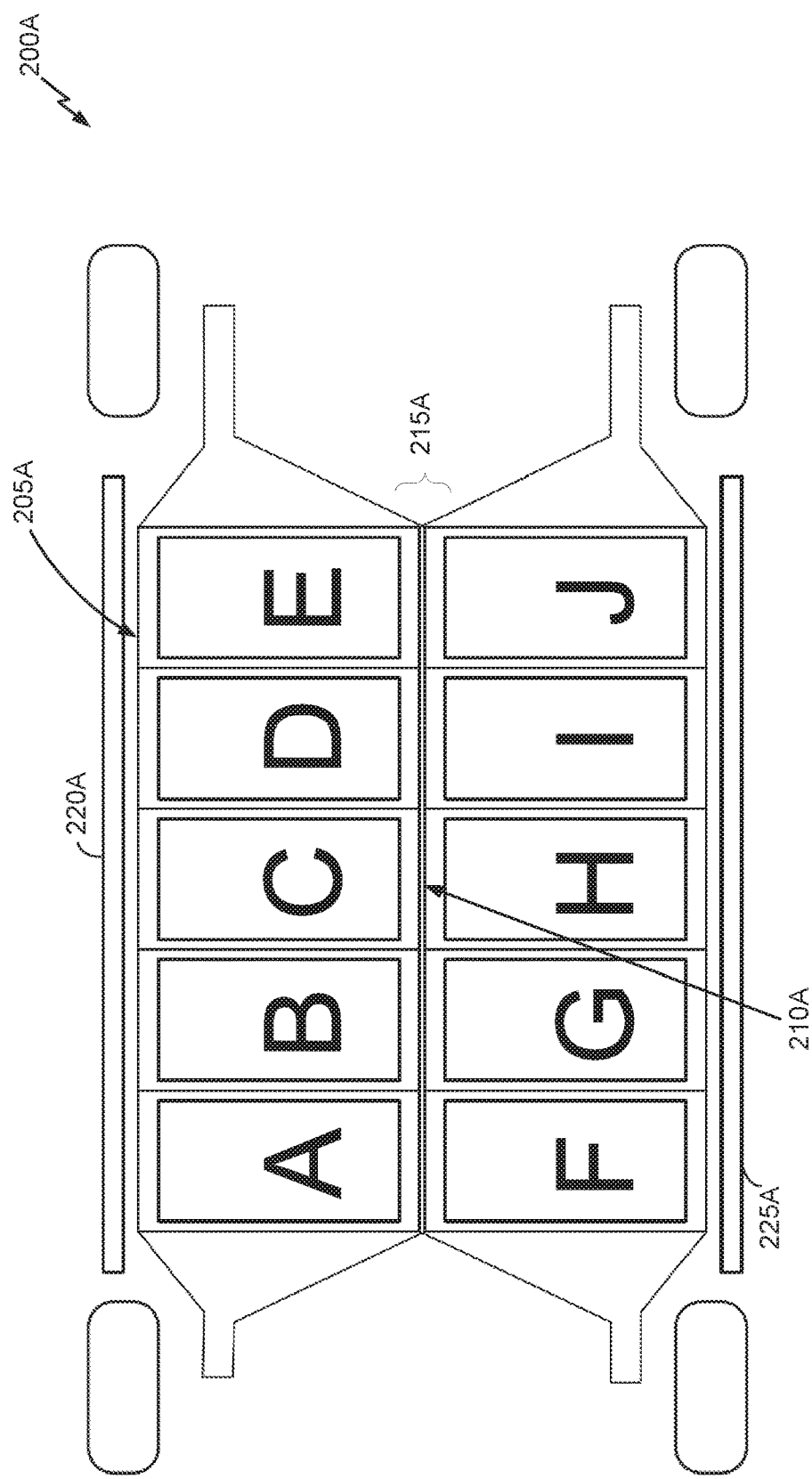
FIG. 2A illustrates a top-perspective of a cross-section of an electric vehicle including a battery housing in accordance with an embodiment of the disclosure.

FIG. 2A illustrates a top-perspective of a cross-section of an electric vehicle 200A including a battery housing 205A in accordance with an embodiment of the disclosure. FIG. 2A depicts various well-known components (e.g., wheels, axles, etc.) of the electric vehicle 200A to provide general context, but these components are not described in detail below for the sake of brevity. With respect to FIG. 2A and other FIGS described below, reference to battery "housing" and battery "module mounting area" is somewhat interchangeable. The battery module mounting area in FIG. 2A (and other FIGS described below) refers to an arrangement of battery module compartments configured to receive insertion of battery modules and to be sealed via insertion-side covers to form a battery housing. Unlike the trough or bathtub-style battery module mounting area 105 described above with respect to FIGS. 1A-1C, the battery module compartments may be sealed individually or in groups, such that at least some of the battery module compartments are sealed from other battery module compartments in the same battery housing, as will be described below in more detail.

Further, in at least one embodiment, the battery module mounting area is part of a floor of the electric vehicle that acts as a structural component that is permanently (or irremovably) integrated into a chassis of the electric vehicle 200A (e.g., via welding or gluing, in contrast to FIGS. 1A-1C where the battery module mounting area 105 is simply bolted onto the chassis). Integrating the battery module mounting area as a permanent or irremovable fixture of the chassis of the electric vehicle 200A helps to structurally reinforce the electrical vehicle 200A, as will be described in more detail below. However, while not described in detail below, it is also possible for the battery module mounting area to be attached to the chassis of the electric vehicle 200A (e.g., via bolts, etc.) without being part of the chassis itself. Accordingly, embodiments of the disclosure are not limited to a permanent or irremovable implementation of the battery module mounting area. Also, as noted above, the battery housing refers to a sealed combination of the battery module mounting area plus any associated covers, seals or interface components (e.g., cooling system interface plugs or connectors plus associated seals, electrical system interface components such as LV/HV connectors and associated seals, etc.).

Referring to FIG. 2A, the battery housing 205A includes ten battery module compartments denoted as A . . . J, and a middle bar 210A that is positioned between battery module compartments A . . . E and battery module compartments F . . . J on different longitudinal sides of the electric vehicle 200A. Each battery module compartment includes a frame (or plurality of walls) defining an interior space configured to fit a respective battery module, and an insertion-side which may be opened to facilitate insertion and/or removal of the respective battery module. The middle bar 210A may be constructed from the dividers (or firewalls) that separate laterally adjacent (e.g., aligned laterally or width-wise along the Y axis) battery module compartments A . . . J (e.g., the firewall between battery module compartments A and F, the firewall between battery module compartments B and G, etc.).

In an example, the middle bar 210A may be one single longitudinal "bar" that extends across the entirety of the battery housing 205A. In this case, the interior side-walls of each battery module compartment may be attached to the middle bar 210A to form the battery module mounting area. In an alternative example, each laterally adjacent battery module compartment pair may be pre-constructed as a battery module compartment chamber with its own chamber-specific firewall for separating its respective laterally adjacent battery module compartments. The battery module compartment chambers may be stacked longitudinally to form the battery module mounting area, as will be discussed below with respect to FIGS. 3B-3C. In this case, the middle bar 210A is an aggregation of the individual firewalls contained in each respective battery module compartment chamber across the battery housing 205A.

While the middle bar 210A is illustrated in FIG. 2A as being centered in the battery housing 205A, the middle bar 210A can be positioned in other locations (e.g., closer to one side or the other, so as to fit differently-sized battery modules on left and right sides of the battery module mounting area) in other embodiments. Further, multiple middle bars could be deployed in other implementations. For example, a particularly wide vehicle may be equipped with a battery module mounting area that is wider than the lengths of two battery modules, such that a gap may be present between the two battery modules inserted into a laterally adjacent pair of battery module compartments. In this case, two separate firewalls may be used for each laterally adjacent battery module compartment so that respective battery modules can comfortably fit therein, with a gap in-between the two firewalls. The two firewalls may form part of two separate "middle" bars (even though each respective firewall may be offset from a center or middle of the battery housing 205A), with the two separate middle bars either corresponding to two long "bars" extending across the battery housing 205A or two aggregations of chamber-specific firewalls from longitudinally stacked battery module compartment chambers. In at least one embodiment, the gap between the two separate middle bars may be used as a tunnel space (e.g., to facilitate optical communication, to run LV/HV busbars, etc.), although the embodiments describe below relate to an implementation where the tunnel space is defined above the battery module compartments (i.e., higher along the Z axis), and not in a gap between laterally adjacent battery module compartments.

It will be appreciated that the battery housing 205A including ten battery module compartments A . . . J is shown in FIG. 2A for example purposes only. For example, as described below with respect to FIGS. 6-7, an electric vehicle with a longer wheel base may be configured with a battery housing having more battery module compartments (e.g., 12, 14, etc.), while an electric vehicle with a shorter wheel base may be configured with a battery housing having fewer battery module compartments (e.g., 8, 6, etc.).

As used herein, a "battery module" is a package that contains a plurality of battery cells, such as lithium ion battery cells. Battery modules could be configured with a prismatic or pouch battery cell arrangement (sometimes referred to as a soft pack), while other battery modules are configured with a cylindrical battery cell arrangement. Generally, prismatic or pouch battery modules are more efficient in terms of battery cell stacking, while cylindrical cells in cylindrical battery modules do not stack as well (e.g., more empty space inside battery module) but have a higher energy density (and any empty space can be repurposed, for cooling and fire prevention because air is a good heat insulator).

Referring to FIG. 2A, battery module compartments A . . . J form part of a battery module mounting area of the battery housing 205A which is sealed in part by a plurality of covers installed on (or closed over) a respective insertion-side of each battery module compartment. More specifically, when the respective covers are installed, some or all of the battery module compartments A . . . J are each configured to be sealed from each other as well as with respect to an environment external to the battery housing 205A. Further, the battery module compartments A . . . E are arranged longitudinally (i.e., along X direction or lengthwise with respect to electric vehicle) on a right-side of the electric vehicle 200A, while battery module compartments F . . . J are arranged longitudinally on a left-side of the electric vehicle 200A. In an example, to form a seal, the plurality of covers may each be configured with a sealing substance or compound (e.g., dispensed foam, rubber or a sealing adhesive such as glue or caulk). In at least one embodiment, a right-side bumper 220A and a left-side bumper 225A may be attached to the battery housing 205A on the right-side and left-side of the electric vehicle 200A, respectively.

As used herein, a battery module compartment being "sealed" refers to a seal that is at least water-tight or liquid-tight, and optionally gas-tight (at least, with respect to certain gases such as smoke from fire, carbon, electrolyte particles, etc.). Generally, the sealing of the battery module compartments is a result of its interior walls being welded or glued together (where possible), and any connection interfaces (e.g., insertion-side cover, coolant interface plugs, electrical interface connectors, etc.) being sealed with a suitable type of sealant (e.g., O-ring, rubber gasket, sealing compound, etc.). While the sealing of the battery module compartments could potentially be hermetic (e.g., gas-tight with respect to all gases), hermetic sealing is not necessary (e.g., due to high cost). Accordingly, the sealing of the battery module compartments may be configured to block propagation of likely contaminants (e.g., liquids such as water, flames and/or smoke from fires, carbon, electrolyte particles, etc.) between battery module compartments.

Referring to FIG. 2A, in at least one embodiment, each respective cover may be implemented as an endplate that is physically integrated with a corresponding battery module. In this case, when the cover (or endplate) is secured into a battery module compartment, the position and orientation of the battery module inside of the battery module compartment can be controlled (or fixed) based on the battery module being sandwiched between the cover (or endplate) on one side of the battery module compartment and at least one interior wall (or firewall) (e.g., multiple firewalls may be used to help to define a tunnel space between battery module compartments A . . . E and batter module compartments F . . . J as described below in more detail) on an opposing side of the battery module compartment (e.g., between battery module compartments A and F, B and G, C and H, D and I, or E and J). In this manner, the endplate and battery module compartment may be closed and sealed to form a closed compartment profile that functions as a stiff structural element that helps to stiffen (or structurally reinforce) the electric vehicle 200A. In particular, the firewalls between laterally adjacent batter module compartments form a strong middle bar 210A as noted above, while laterally aligned interior walls of the battery module compartments form a series of structural support bars arranged perpendicularly to the middle bar 210A along the Y axis. The middle bar 210A and laterally aligned interior bars may function together to increase the stiffness of the battery housing 205A as well as to increase resistance to deformation in the shape of the battery housing 205A (e.g., increased resistance to a torsion-effect that changes a parallelogram shape of the battery housing 205A).

As will be described in more detail below, the insertion-side for the battery module compartments A . . . J may vary between different battery module mounting area configurations. For example, the plurality of covers that cover the insertion sides of battery module compartments A . . . J may comprise top-covers for a top-inserted battery module mounting area configuration, or side-covers for a lateral-inserted battery module mounting area configuration or a hinged-inserted battery module mounting area configuration. Also, as will be described in more detail below, in certain embodiments, a 1:1 ratio between the plurality of covers and the battery module compartments A . . . J is maintained, such that each cover is configured to individually cover (and seal) a single battery module compartment (e.g., N covers for N battery module compartments). In an alternative embodiment, one or more covers may be configured to cover (and seal) a group of battery module compartments, although unlike the top-cover 110 depicted in FIGS. 1A-1C, the group of battery module compartments will include less than all of the battery module compartments. In the case of a group-cover, the battery module compartments that are part of the group are sealed from any adjacent battery module compartment outside of the group. In one example, each of the plurality of covers may be configured to seal two battery module compartments (e.g., N/2 covers for N battery module compartments). As used herein, reference to a "subset" of battery module compartments refers to either an individual battery module compartment that is individually sealed by a single corresponding cover or a group of two or more (and less than all) battery module compartments that are collectively sealed by a single corresponding cover.

Referring to FIG. 2A, the middle bar 210A is configured to increase the overall stiffness of the battery housing 205A (and thereby, the electric vehicle 200A). In an example, the middle bar 210A may be positioned underneath a tunnel space 215A that, similar to the middle bar 210A, may be centered between battery module compartments A . . . E and battery module compartments F . . . J. As noted above, the battery module compartment firewalls that comprise the middle bar 210A limit propagation of hazards (e.g., excessive heat or fire, fluid leaks, etc.) between battery module compartments A . . . E and battery module compartments F . . . J. The tunnel space 215A optionally permits wireless communication (e.g., optical communication) between the battery modules inserted into the battery compartments A . . . J and a wireless communications interface (not shown) that may be deployed at some point along the tunnel space 215A. In an example, the tunnel space 215A may be outside of the battery module compartments A . . . J and effectively on 'top' of the battery housing 205A in the middle (or Y-axis center) of the electric vehicle 200A (e.g., along the top of middle bar 210A). Alternatively, as noted above, instead of being defined over, or on 'top', of the battery housing 205A, the tunnel space 215A may instead be vertically aligned (or level) with the battery modules A . . . J in the battery housing 205A in-between adjacent battery module compartments on different lateral sides of the electric vehicle 200A (e.g., two interior walls or firewalls are used to seal each pair of laterally adjacent battery module compartments, with spaces in-between each pair of laterally adjacent battery module compartments defining the tunnel space 215). While the example embodiment of FIG. 2A depicts ten battery module compartments denoted as A . . . J as noted above, other embodiments of the disclosure may be directed to battery housings with any number of battery module compartments (e.g., to accommodate vehicles with shorter or longer wheel bases, as noted above and described in more detail below with respect to FIGS. 6-7).

While not shown expressly in the top-perspective depicted in FIG. 2A, one or more busbars (e.g., high-voltage (HV) and low-voltage (LV) busbars) may be deployed along the tunnel space 215A to provide an electrical connection between battery modules inserted into any of the battery module compartments A . . . J and a battery junction box (BJB). In an example, each battery module compartment may include HV connectors for connecting battery modules in adjacent battery module compartments in series. For example, the BJB may connect to an HV input connector on battery module compartment J, which is plugged into a battery module and connects to an HV output connector on battery module compartment J. The HV output connector connects to an HV busbar which is connected to an HV input connector on battery module compartment I, and so on. In this manner, the battery module in battery module compartment J may be daisy-chained in series to the battery module in battery module compartment I, which is in turn daisy-chained (in order) to battery modules in battery module compartments H, G, F, A, B, C, D and E, with the HV output connector in battery module compartment E being connected back to the BJB to complete the HV power connection between the BJB and the respective battery modules of the battery housing 205A. In an example, HV connectors may be paired together as a paired HV connector component, with an HV input connector and an HV output connector arranged on different sides of the paired HV connector component (e.g., such that the respective HV connectors are configure do connect to battery modules on different sides of the battery housing 205A). For example, a battery module in battery module compartment J may connect to an HV input connector portion of the paired HV connector component, with a battery module in battery module compartment E connecting to an HV output connector portion of the paired HV connector component. Also, each battery module compartment may also include an LV connector which facilitates a connection between the battery module and the BJB without daisy-chaining to the other battery module compartments as noted above for the HV power connection. The LV connector may function as a data port or data interface between various LV components inside the battery module, such as sensors (e.g., temperature sensors, smoke sensors, etc.), and the BJB. For example, the LV connector may be coupled to an optical communications interface (e.g., an IR interface) arranged inside the tunnel space 215A that has a line-of-sight (LOS) to a corresponding optical communications interface coupled to the BJB to facilitate a data connection between the battery module and the BJB. Alternatively, the LV connector may simply be wired to the BJB via one or more wires that are run along the tunnel space 215A. In an example, using the optical communications interface for supporting the module-to-BJB data connection may simplify battery module installation in the sense that no control wiring is necessary to connect an installed battery module to the BJB (i.e., a technician can simply insert the battery module into a corresponding battery module compartment, which couples the battery module to the LV connector, which is coupled to LV bus bars that bridge a connection to the BJB via the optical communications interface). In an example, the HV connectors and LV connectors in the battery module compartment and integrated into the battery modules may include plug-type and socket-type connectors.

In an example, centering the busbars along the tunnel space 215A in the middle of the electric vehicle 200A helps to isolate the busbars from crash impact zones (e.g., the left and right sides of the electric vehicle 200A), which in turn protects the busbars from crash impact-related damage. Also, defining the tunnel space 215A on top of the middle bar 210A, which may be configured as a strong metal 'spine' of the battery housing 205A, may likewise help to protect the busbars with the tunnel space 215A functioning as a relatively protected area (e.g., from crash impact-related damage, etc.). The tunnel space 215A may also function as an electromagnetic shield that protects the busbars from external electromagnetic interference. In an example, the busbars may be attached to a top-portion of the battery module compartments (e.g., see hole configurations in FIGS. 3B-3C where LV/HV connectors may be inserted) in proximity to the firewall(s), so that the tunnel space 215 remains substantially empty, which may facilitate unobstructed (line-of-sight of point-to-point) communication for optical communications. The central busbars may include LV busbars and HV busbars, as noted above.

With respect to the embodiment whereby the tunnel space 215A is defined on 'top' of the battery housing 205A, in an example, each pair of laterally adjacent battery module compartments may include a set of holes located proximately to the tunnel space 215A and aligned perpendicular to a direction in which the battery module is inserted or removed (e.g., for lateral or side-insertion, the holes may be on an upper wall or top wall of the battery module compartment). LV and HV connectors are mounted into the set of holes for connecting battery modules to LV and HV busbars in the tunnel space 215A. For example, HV connectors and an LV connector may be inserted into the set of holes, and then secured and sealed. Then, when a battery module is inserted into the battery module compartment, an electrical interface of the battery module is aligned with the HV and LV connectors such that the battery module is plugged into the HV and LV connectors upon full insertion into the battery module compartment, and the battery module is disconnected from the HV and LV connectors when removed from the battery module compartment. In an example, the HV and LV connectors may interface with battery modules on both sides of the battery module mounting. As noted above, the HV connectors may each be configured within a paired HV connector component, whereby each paired HV connector component includes a first HV connector configured for coupling to a battery module in a first battery module compartment on one lateral side (e.g., left side or right side) of the battery module mounting area, and also a second HV configured for coupling to a second battery module on the other lateral side (e.g., left side or right side) of the battery module mounting area.

Moreover, battery modules in battery module compartments that are adjacent to each other longitudinally (as opposed to laterally adjacent battery modules) may be electrically coupled to each other via the HV busbars in series, as noted above. In FIG. 2A, this means that 'neighbor' battery modules in battery compartments A and B are electrically coupled, that 'neighbor' battery modules in battery compartments B and C are electrically coupled, and so on. This electric coupling can be chained from battery module compartment to battery module compartment with HV being available at the BJB once a last battery module is inserted (e.g., each of battery module compartments A . . . J).

The LV and HV connectors may be sealed (e.g., via a plastic cover, a rubber gasket, a sealing adhesive, a sealing ring such as an O-Ring in an axial or a radial direction, etc.) so that each battery module compartment is sealed (e.g., either individually or in context with a battery module compartment group if a group-cover is used as noted above). In an example, the LV and HV busbars may be secured to the respective LV and HV connectors via screwing.

As will be described in more detail below, positioning the busbars in the tunnel space 215A may permit workers (e.g., assembly workers at a vehicle assembly plant during assembly of the electric vehicle 200A, maintenance workers, etc.) access to a particular subset of battery module compartments (e.g., an individual battery module compartment with a dedicated cover or a group of battery module compartments that share a single cover) without being exposed to voltage from battery modules outside of the particular subset of battery module compartments. For example, as noted above, the HV connectors of the respective battery module compartments may be positioned in an interior or centered portion of the electric vehicle 200A, while the workers may be located outside the electric vehicle 200A for a lateral module insertion scenario, thereby shielded from the central HV busbars.

In particular, during insertion of a battery module that includes an integrated cover (or endplate), the worker may insert the battery module into a battery module compartment and couple the battery module to at least one corresponding busbar (e.g., via connectors to LV and HV busbars, such as plugs, where the battery module coupling may occur by virtue of the worker pushing or sliding an electrical interface of the battery module into the corresponding connector), and then secure (e.g., by tightening bolts, etc.) the cover (or endplate) to the battery module compartment so that the battery module compartment is sealed. Likewise, during removal, the worker may free or unlock the cover attachment mechanism (e.g., by removing bolts, etc.), and may then slide the battery module out of the battery module compartment. Hence, in at least one embodiment, during either insertion or removal, the worker only accesses the battery module(s) inside one particular subset of battery module compartments and its associated busbar(s) at a time without exposing the workers to the HV busbars. By contrast, in FIGS. 1A-1C, removal of the top-cover 110 exposes workers to each installed battery module as well as all the associated busbars, including HV busbars. Hence, granting the workers access to the battery modules of the battery housing 205A on a subset-specific basis (e.g., while sealing off any high-voltage (HV) wiring as discussed below with respect to pipe 355A of FIG. 3A) functions to reduce a level of voltage that the workers may be exposed to in association with battery module insertion/removal during assembly and/or maintenance of the electric vehicle 200A.

In an embodiment, the BJB may also be positioned in a middle or center (longitudinally) of the electric vehicle 200A on top of the battery housing 205A. For example, to simplify and/or shorten HV routing and improve safety, the BJB may be positioned at one end of the battery housing 105 above the battery module compartments E and J, or alternatively at the other end of the battery housing 105 above the battery module compartments A and F). In an example, positioning the BJB in the middle of the electric vehicle 200A above the tunnel space 215A may reduce an electrical connection length between the BJB and electrical connections to the battery modules due to the busbars being run along the tunnel space 215A. However, it will be appreciated that the BJB can be placed anywhere in the electric vehicle 205 and is not required to be installed proximately to the battery housing 205A. While not shown expressly in FIG. 2A, an underride guard may be attached to an underride of the battery housing 205A to protect the battery from bollards or parts from below.

Figure 2B:
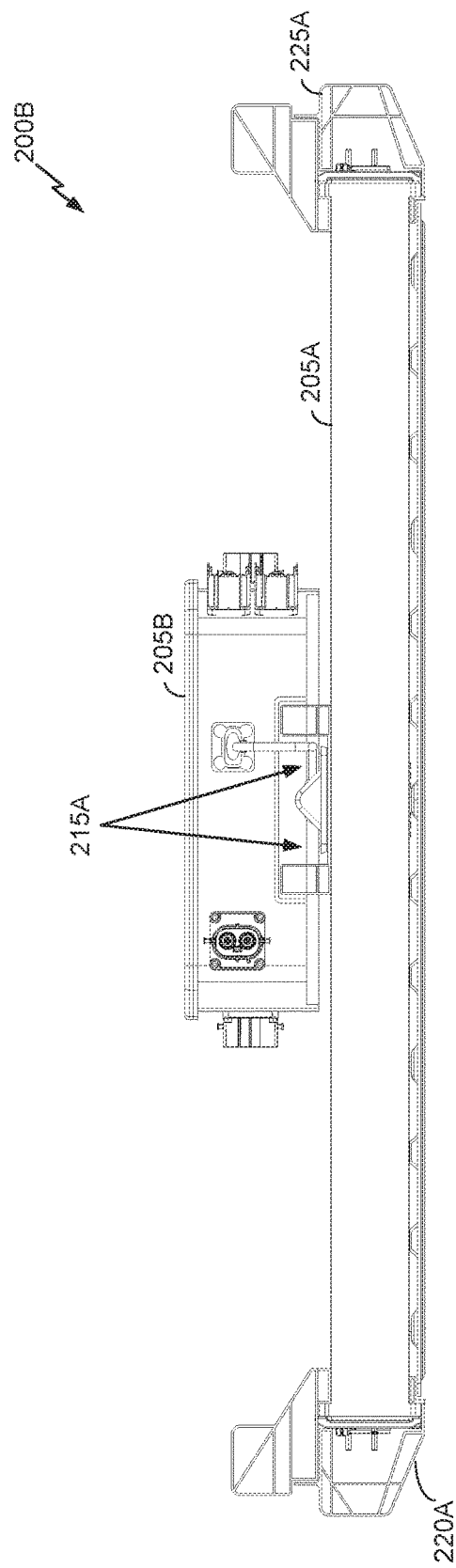
FIG. 2B illustrates a front-perspective of a battery housing arrangement of the electric vehicle in accordance with an embodiment of the disclosure.

FIG. 2B illustrates a front-perspective of a battery housing arrangement 200B of the electric vehicle 200A in accordance with an embodiment of the disclosure. Referring to FIG. 2B, a BJB 205B is shown as mounted onto the battery housing 205A in a longitudinally centered-position above the middle bar 210A, with right-side bumper 220A and left-side bumper 225A being attached to the battery housing 205A. The tunnel space 215A is also depicted above the battery housing 205A.

Referring to FIGS. 2A-2B, in at least one embodiment, electrical interfaces (e.g., the LV and HV connectors installed in holes of a respective battery module compartment through which battery modules connect to the LV and HV busbars as noted above) between the battery modules in battery module compartments A . . . J and the busbars may be sealed (e.g., with an O-ring or rubber gasket, a sealing adhesive such as glue, etc.). The holes in each respective battery module compartment may be sealed either radially or axially. In an example, each battery module compartment cover (or subset of battery module compartments sharing a single cover), and sealed electrical interface (and possibly other sealed interfaces such as sealed input/output cooling tube connectors to a cooling system as discussed below in more detail) function together to seal an individual battery module compartment (or subset of battery module compartments sharing a single cover) with respect to hazards such as excessive heat or fire, liquid and/or gases, as well as environmental hazards (e.g., liquids seeping into the battery housing 205A from a vehicle interior, etc.), so that a hazard (or contaminant) in one particular battery module compartment (or subset of battery module compartments sharing a single cover) is contained and does not propagate to adjacent battery module compartments.

FIG. 2C illustrates an impact distribution 200C through the battery housing 205A of the electric vehicle 200A from a left side-perspective in accordance with an embodiment of the disclosure. In FIG. 2C, crash forces 205C cause impact to a front of the electric vehicle 200A. The crash forces 205C are distributed substantially along an upper layer 210C (e.g., including a top-side of the respective battery module compartments plus one or more reinforcement bars) and a lower layer 215C (e.g., including a bottom-side of the respective battery module compartments plus one or more reinforcement bars and/or an underride guard) of the battery housing 205A, as depicted in FIG. 2C with arrows. The battery housing 205A, in part due to the arrangement of the middle bar 210A (not shown explicitly in FIG. 2C) and lateral interior bars 220C (e.g., formed from side-walls of the battery module compartments which run perpendicular to the middle bar 210A), forms a closed compartment profile (e.g., formed by the stacked and individually sealed subsets of battery module compartments), which provides higher stiffness (or resistance to impact forces) in longitudinal, transverse and torsion directions relative to the battery housing configuration depicted in FIGS. 1A-1C. In an example, the lower layer 215 may include a bottom-wall of the individual battery module compartments and/or A . . . J and/or an underride guard that is affixed to the entire underride of the battery housing 205A.

Figure 3A:
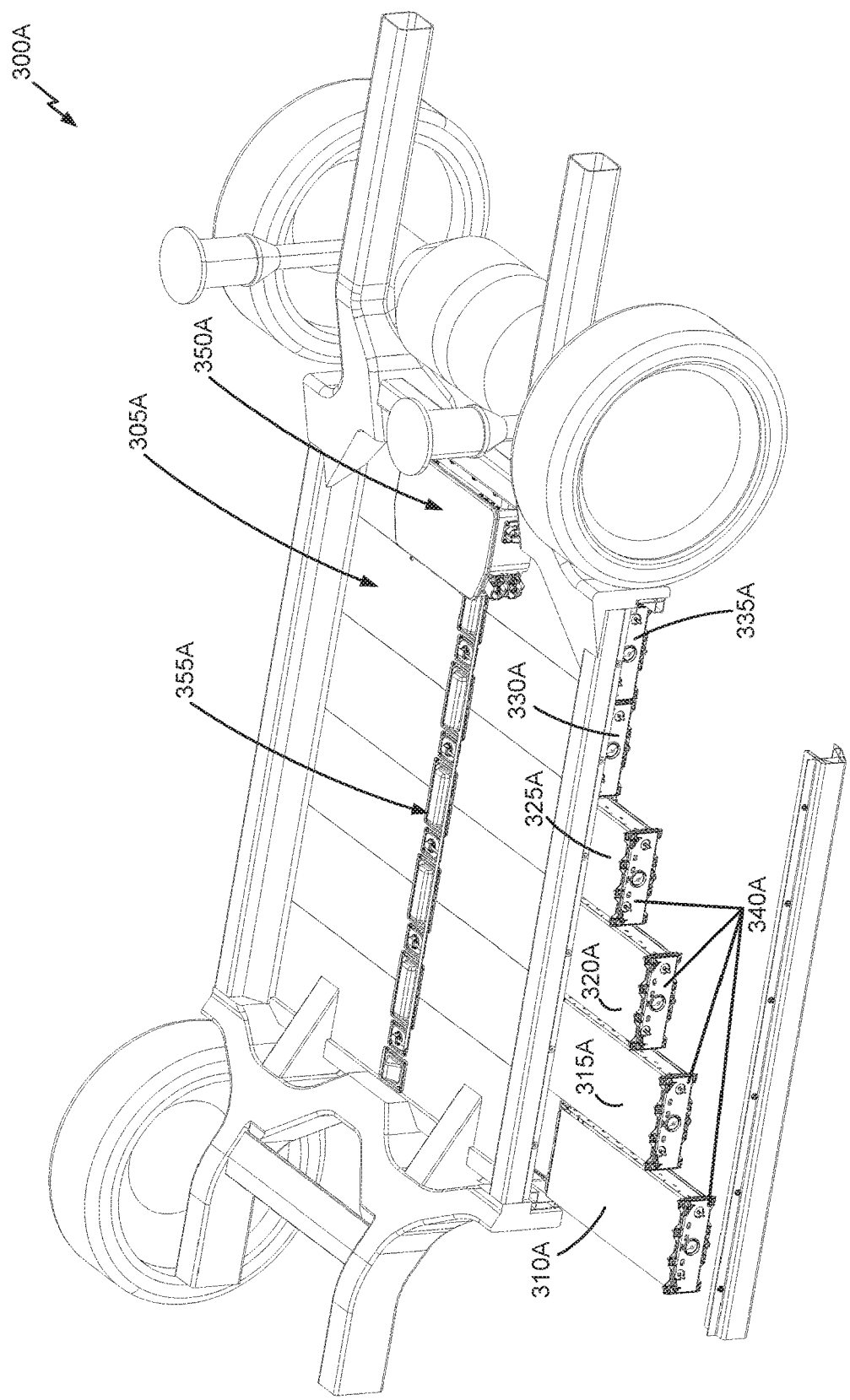
FIG. 3A illustrates a lateral-inserted battery module mounting area configuration for a battery housing of an electric vehicle in accordance with an embodiment of the disclosure.
Figure 3B:
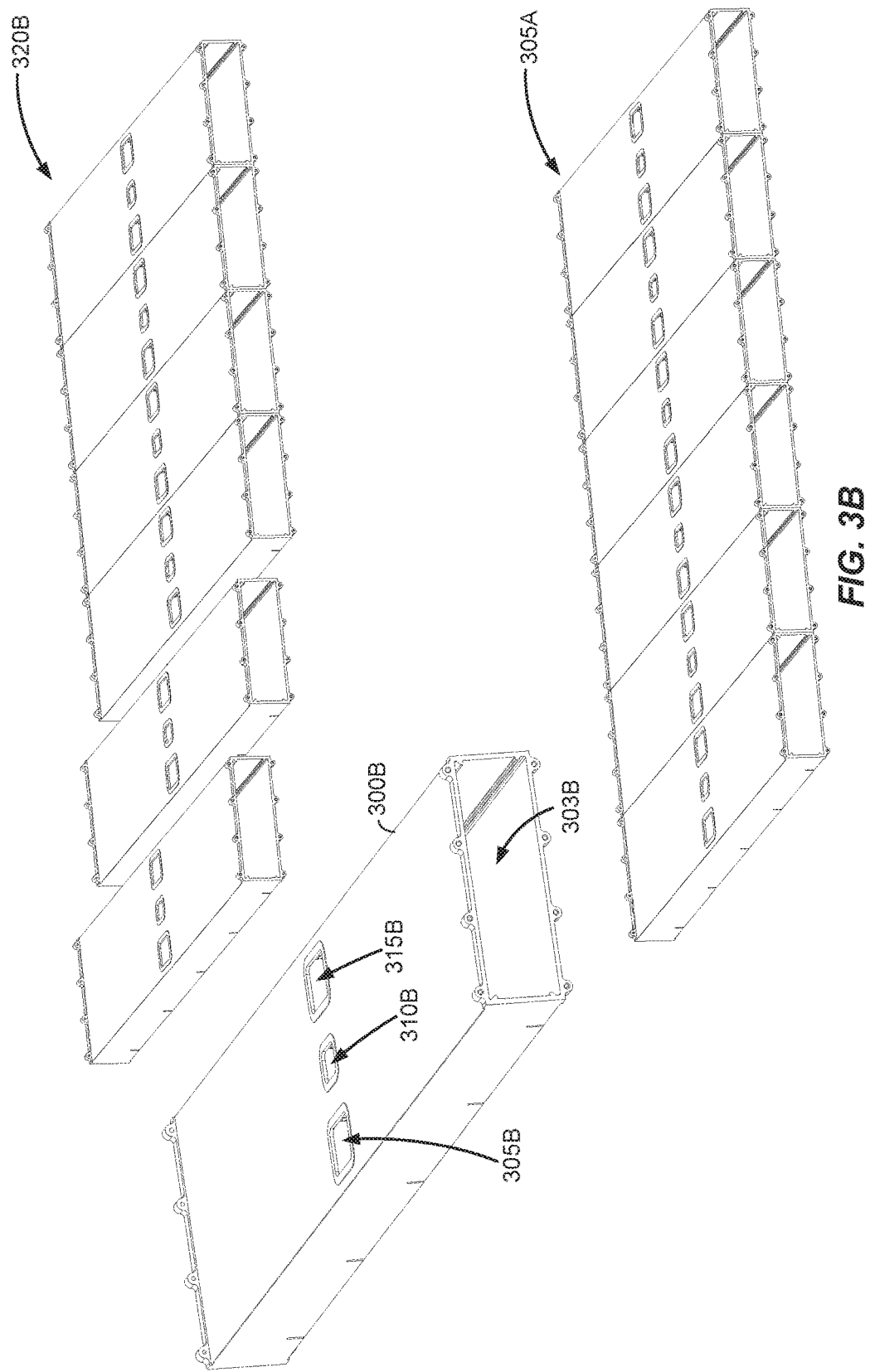
FIG. 3B illustrates example construction of a lateral-inserted battery module mounting area configuration in accordance with an embodiment of the disclosure.
Figure 3C:
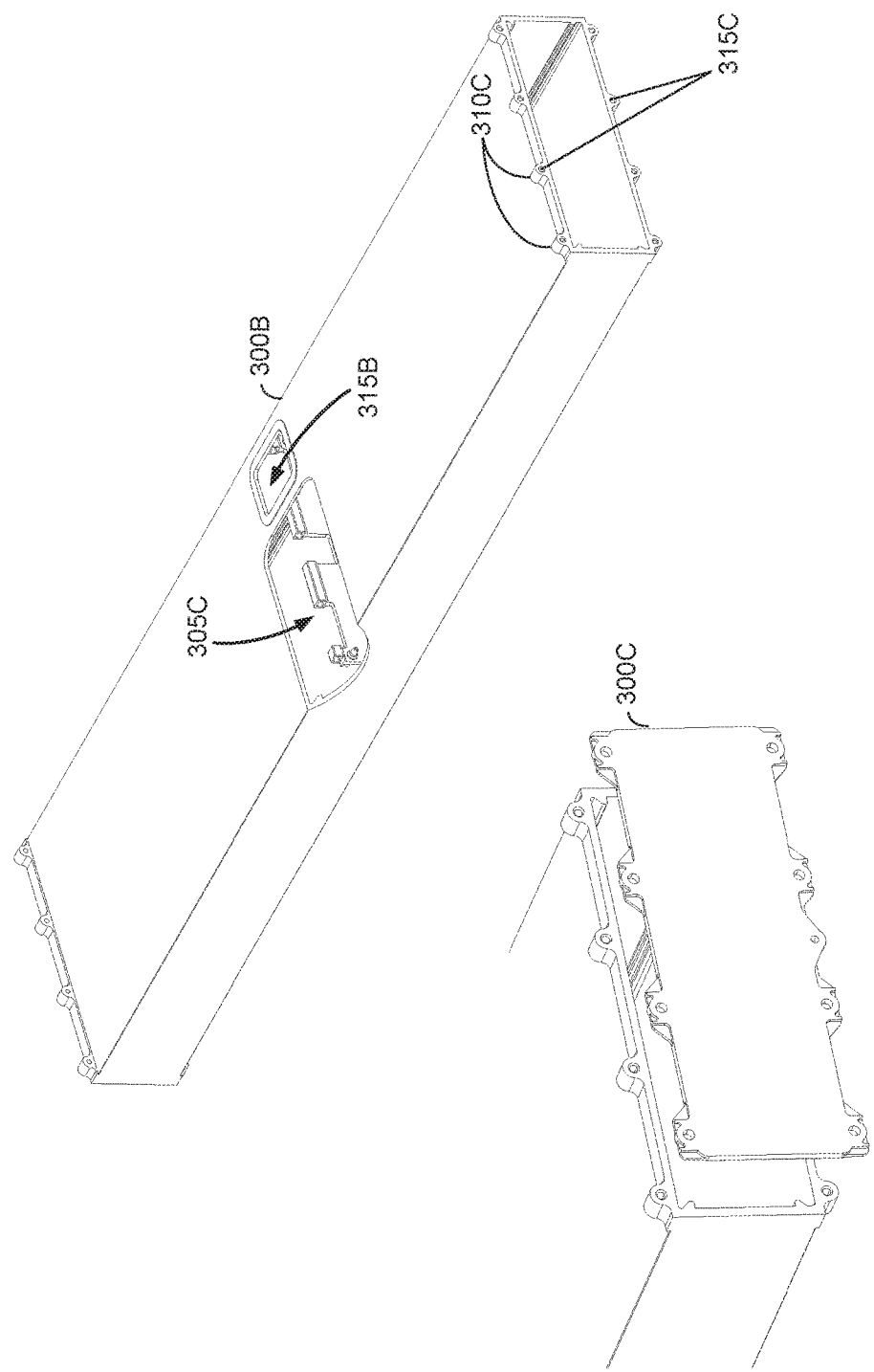
FIG. 3C illustrates an example of the battery module compartment chamber of FIG. 3B in more detail in accordance with an embodiment of the disclosure.
Figure 3D:
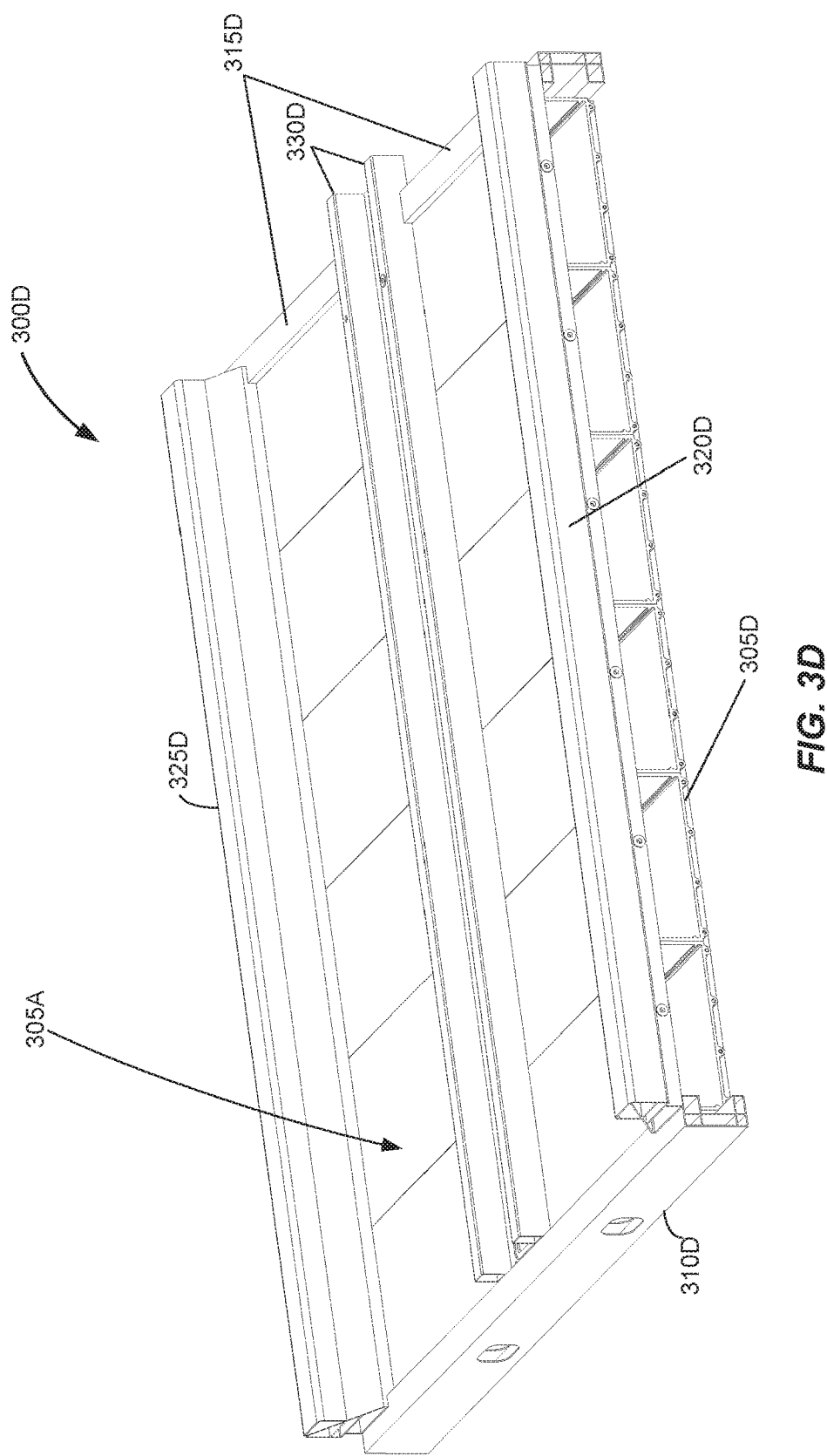
FIG. 3D illustrates a battery housing reinforcement configuration in accordance with an embodiment of the disclosure.
Figure 3E:
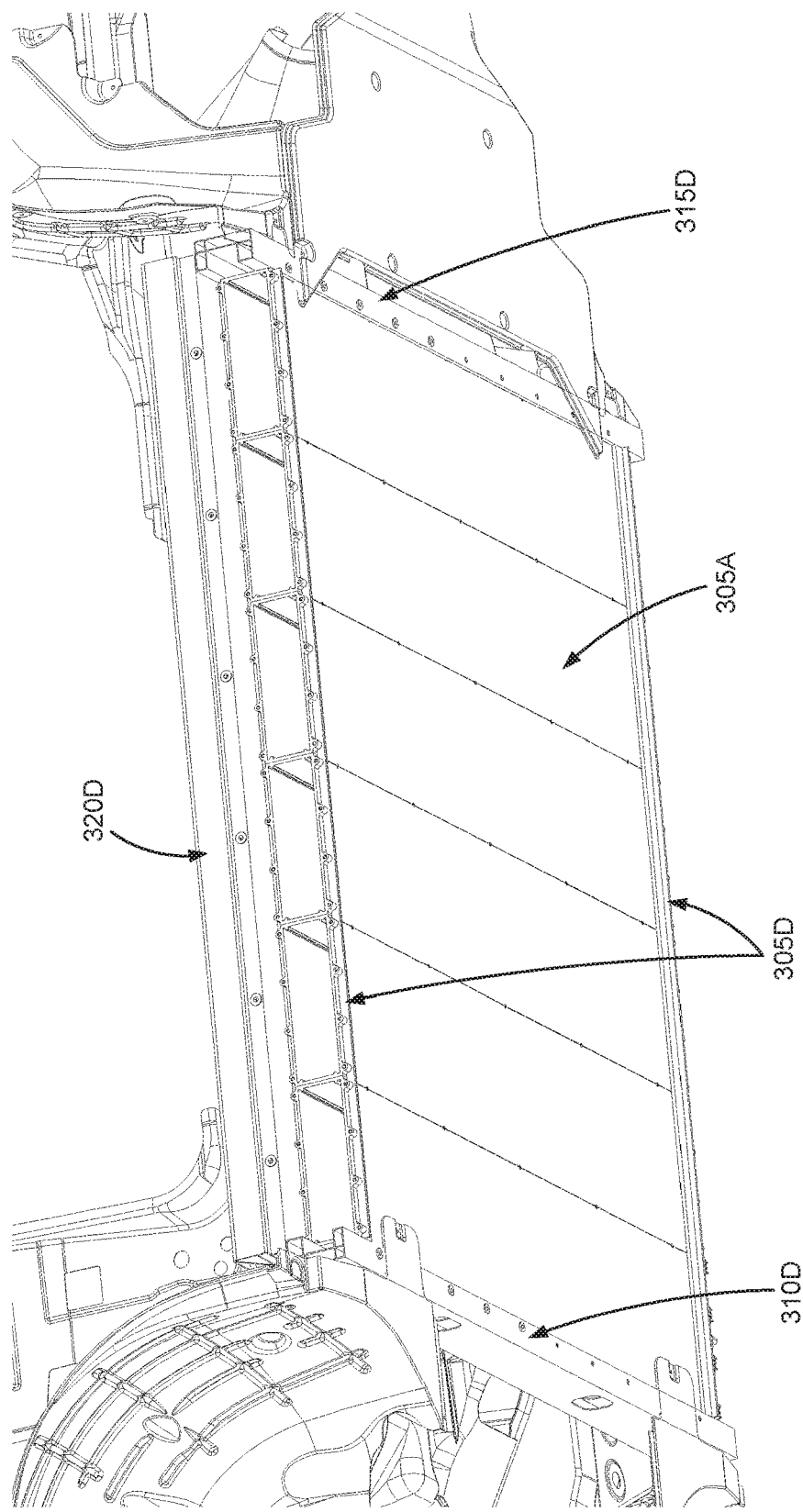
FIG. 3E illustrates the battery housing reinforcement configuration of FIG. 3D installed in an electric vehicle from a bottom-perspective in accordance with an embodiment of the disclosure.

In other words, in at least one embodiment, the battery housing 205A forms a "sandwich" structure that is comprised of an underride guard, the closed compartment profile (e.g., formed by the stacked and individually sealed subsets of battery module compartments) which provides the middle bar 210A (e.g., formed from the respective firewalls between laterally adjacent battery module compartments) as well as the lateral interior bars 220C, and longitudinal top/bottom beams (e.g., described below in more detail below as top/bottom bars with respect to FIGS. 3C-3E). In an example, the sandwich structure created by the above-noted components permits the battery housing 205A to act as a permanent or irremovable structural element of a chassis (e.g., based on welding and/or gluing of the respective components to the chassis) of the electric vehicle 200A. Moreover, a removable rocker panel (which is not directly a part of the battery housing 205A or associated sandwich structure) may be attached after the insertion (and sealing) of the battery modules to help guide crash forces to the sandwich structure of the battery housing 205A.

Figure 2D:
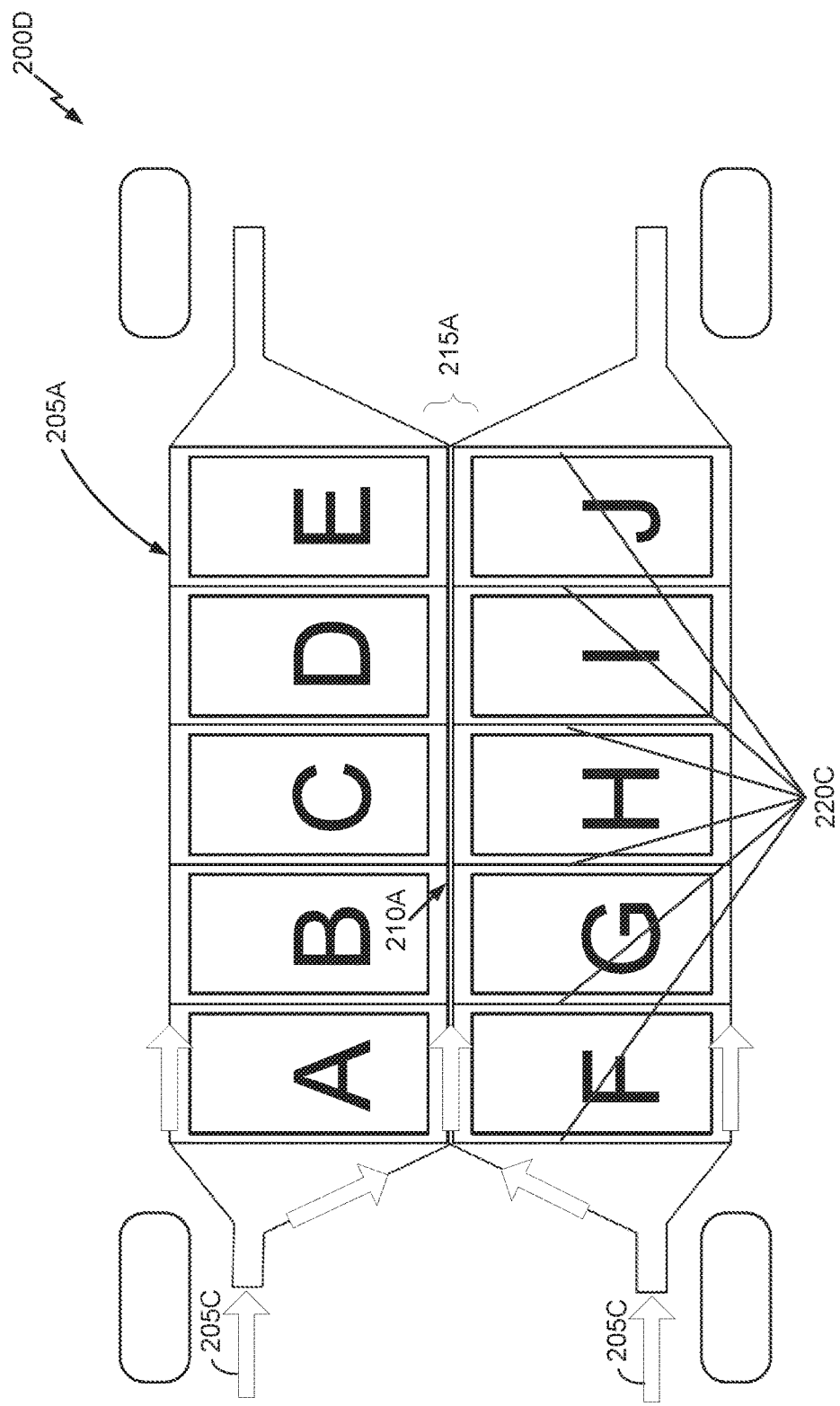
FIG. 2D illustrates an impact distribution through the battery housing of the electric vehicle from a top-perspective in accordance with an embodiment of the disclosure.

FIG. 2D illustrates an impact distribution 200D through the battery housing 205A of the electric vehicle 200A from a top-perspective in accordance with an embodiment of the disclosure. The top-perspective depicted in FIG. 2D is similar to FIG. 2A, except that the force distribution from the crash forces 205C is depicted in FIG. 2D with arrows. The battery housing 205A, in part due to the arrangement of the middle bar 210A and the outer side-walls (e.g., for lateral insertion, this would include the insertion-side covers of battery module compartments A . . . J) function to distribute the crash forces 205C substantially along the middle bar 210A and the outer walls of the battery housing 205A. Accordingly, considering FIGS. 2C-2D together, the crash forces 205C are distributed substantially along the upper layer 210C and the lower layer 215C while at the same time being distributed substantially along the middle bar 210A and the outer walls of the battery housing 205A, which collectively functions to reduce stress upon the battery module compartments A . . . J and associated busbars relative to the battery housing configuration depicted in FIGS. 1A-1C.

Figure 2E:
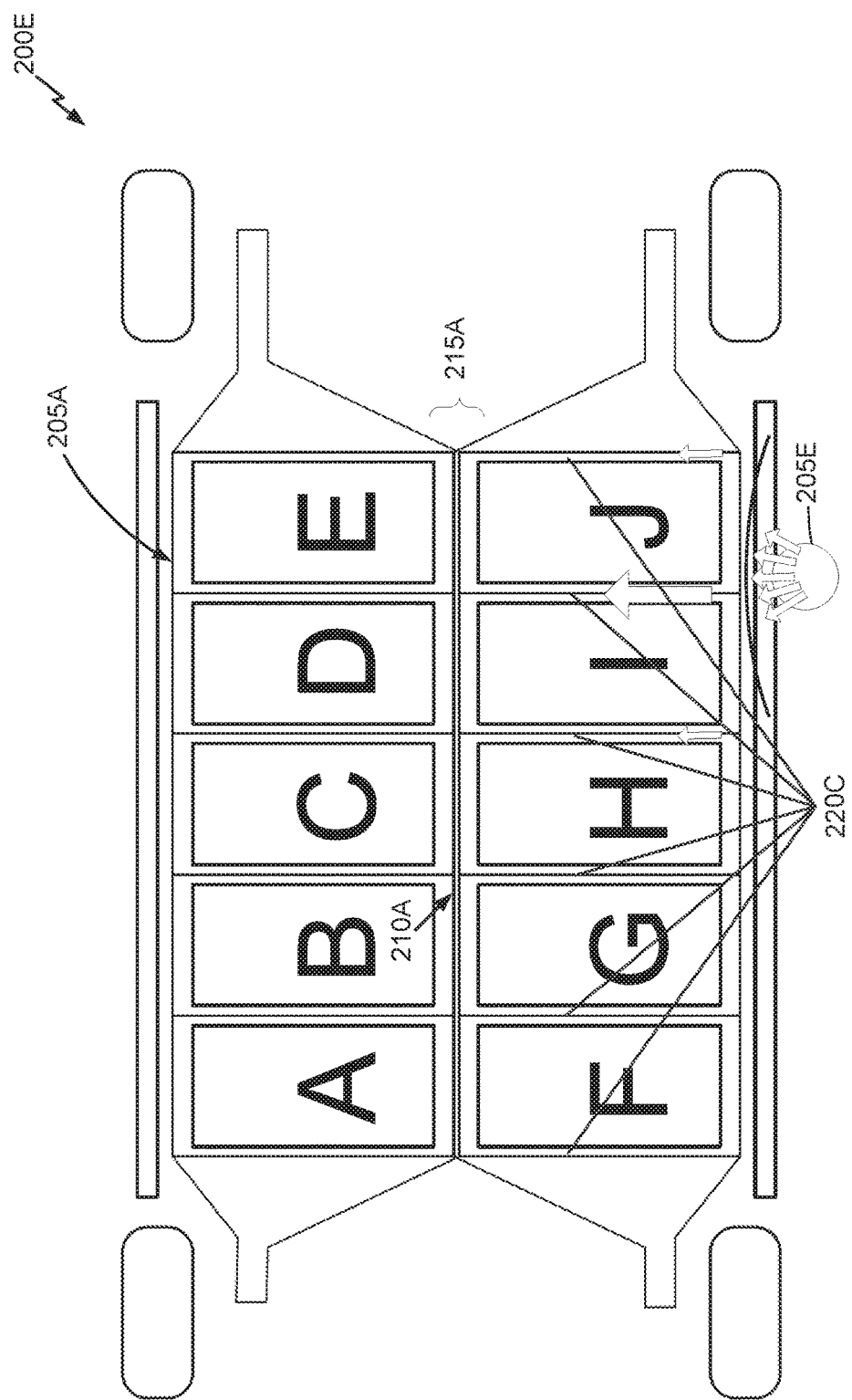
FIG. 2E illustrates an impact distribution through the battery housing of the electric vehicle from a top-perspective in accordance with another embodiment of the disclosure.

FIG. 2E illustrates an impact distribution 200E through the battery housing 205A of the electric vehicle 200A from a top-perspective in accordance with another embodiment of the disclosure. In FIG. 2E, crash forces 205E cause impact to a left-side of the electric vehicle 200A. The top-perspective depicted in FIG. 2E is similar to FIG. 2A, except that the force distribution from the crash forces 205E is depicted in FIG. 2E with arrows. As shown in FIG. 2E, the battery housing 205A functions to distribute the crash forces 205E substantially along the lateral interior bars 220C which are formed from side-walls of the battery module compartments A . . . J. More specifically, in an example, the crash forces 205E will first contact the removable rocker panel. By the deformation of the rocker panel, the crash forces 205E will be distributed to the designed force paths, which will ensure that the crash forces 205E are transferred substantially 'around' the battery modules (i.e., through the lateral interior bars 220C) of the battery module compartments. This will help to ensure that the battery cells inside the respective battery modules of the battery module compartments will undergo little to no deformation in response to the crash forces 205E. While not shown explicitly in the top-perspective of FIG. 2E, the crash forces 205E may also be distributed along the upper layer 210C and the lower layer 215C as well.

Even if the battery housing 105 depicted in FIGS. 1A-1C includes some type of wall, divider or bridge between the slots containing the battery modules 115-120 for reinforcement, the deployment of the single top-cover 110 (e.g., typically made out of plastic or thin sheet metal) restricts the amount of force distribution along these walls, dividers, or bridges relative to the side-walls of the battery module compartments A . . . J. For example, in an implementation where each of battery module compartments A . . . J includes its own dedicated cover, each battery module compartment side-wall (which forms part of a lateral interior bar 220C) would be stiffer and hence facilitate more force distribution relative to the inter-module dividers used in FIGS. 1A-1C which are all covered by the single top-cover 110. In another example, in an implementation where a subset of battery module compartments include a group-specific cover, the respective battery module compartment side-walls (each of which form part of a lateral interior bar 220C) would still be stiffer and hence facilitate more force distribution relative to the inter-module dividers used in FIGS. 1A-1C which are all covered by the single top-cover 110.

Referring to FIGS. 2A-2E, in an embodiment, a cooling plate can be integrated into each battery module. In an example, the cooling plate may be positioned directly on the bottom of battery modules (e.g., for cylindrical cells) or in some other position (e.g., for prismatic or pouch cells). In a pouch cell example, if the pouch cells are horizontally oriented, the cooling plate may be positioned on the left and right sides of the battery module. Alternatively, if the pouch cells are vertically oriented, the cooling plate may be mounted directly on the bottom of battery modules, similar to cylindrical cells. The cooling plate may attach to a cooling interface (e.g., cooling tubes that connect to coolant tube plug connections through which coolant fluid is pumped to carry heat away from the battery module). In one embodiment, the input/output cooling tube plug connections may be integrated into an insertion-side cover of each battery module compartment. So, the input/output cooling tube plug connections may be integrated into the insertion-side cover, which in turn may be integrated with the battery module.

In an example, the cooling tubes may connect to a cooling system located outside of the battery housing 205A (e.g., via a cooling manifold). In a further example, all plug connections from the cooling system may be located on an exterior-facing side of the battery housing 205A (e.g., via integration into an exterior-facing battery module compartment cover). Thus, in case of a crash where a manifold outside the battery housing 205A is damaged, cooling liquid will leak out of the electric vehicle 200A without reaching the battery modules in the sealed battery module compartments (e.g., a breaking point (or area) may be defined such that, in the event of deformation to the rocket panel caused by a crash impact, the cooling tubes are disconnected). In an example, as noted above, the input/output cooling tube plug connectors for the cooling system may be built into a cover for a battery module compartment. Via their metallic construction (e.g., sheet metal construction, extruded or die-cast aluminum construction, etc.), each battery module compartment may function as a heat sink that siphons heat from its battery module towards its cooling plate (e.g., which may be located at the bottom of the battery module), which then routes the heat the away from the respective battery module compartment via the cooling tube.

The battery housing 205A described above with respect to FIGS. 2A-2E may be based on various battery module mounting area configurations, as will be described below with respect to FIGS. 3A-5D. In particular, FIGS. 3A-3E describe a lateral-inserted battery module mounting area configuration, FIG. 4 describe a hinged-inserted battery module mounting area configuration and FIGS. 5A-5E describe vertically-inserted battery module mounting area configurations.

FIG. 3A illustrates a lateral-inserted battery module mounting area configuration for a battery housing of an electric vehicle 300A in accordance with an embodiment of the disclosure.

Referring to FIG. 3A, the electric vehicle 300A includes a battery module mounting area 305A that includes, on a left side of the electric vehicle 300A, battery module compartments configured to receive battery modules 310A-335A via left-side lateral insertion. In FIG. 3A, battery modules 310A-325A are shown at different degrees of lateral insertion, while battery modules 330A-335A are shown in a fully-inserted state. While not shown explicitly in FIG. 3A, the battery module mounting area 305A may further include, on a right side of the electric vehicle 300A, battery module compartments configured to receive other battery modules 310A-335A via right-side lateral (or side) insertion. More specifically, the insertion-sides of the battery modules 310A-335A correspond to the left exterior-facing lateral side of each respective battery module compartment on the left side (longitudinally) of the electric vehicle 300A, and the insertion-sides of the battery modules of each respective battery module compartment on the right side (longitudinally) correspond to the right exterior-facing lateral side of the electric vehicle 300A. By virtue of the insertion-side being exterior-facing, workers may access the individual battery module compartments for insertion and/or removal of battery modules without having to maneuver themselves inside of the electric vehicle 300A.

Also shown in FIG. 3A are a set of covers 340A which can be attached to the battery module compartments upon insertion of the battery modules 310A-335A. in an example, the set of covers 340A may either be integrated with their respective battery modules 310A-335A prior to installation into the battery module mounting area 305A, or alternatively may be separate components from the battery modules 310A-335A which are installed (e.g., via bolts, etc.) after insertion. As shown in FIG. 3A, each battery module 310A-335A include two cooling tube plug connectors configured to be threaded through corresponding holes in the set of covers 340A for connecting to an external cooling manifold. Also, as noted above, the ratio between battery module compartments and covers may vary by implementation. For a 1:1 ratio, the set of covers 340A includes a single (or dedicated) cover for each of the battery module compartments that receive the battery modules 310A-335A. Alternatively, some or all of the set of covers may be configured to cover multiple battery compartments (e.g., one cover may be configured to cover the battery module compartments for battery modules 310A-320A while another may be configured to cover the battery module compartments for battery modules 325-335A for a 3:1 ratio of battery module compartments to covers, etc.). In yet another alternative embodiment, one single cover may be configured to cover the battery module compartments for battery modules 310A-335A on the left-side of the electric vehicle 300A, while another single cover may be configured to cover the battery module compartments for battery modules on the right-side of the electric vehicle 300A. In another example, the ratio of battery module compartments to covers need not be the same on both exterior-facing lateral sides of the electric vehicle 300A. In yet another example, differently-sized covers can be used on either exterior-facing lateral side of the electric vehicle (e.g., the battery module compartments for battery modules 310A-325A may each have their own dedicated covers while the battery module compartments for battery modules 330A-335A are allocated a combined cover). Rocker panel 345A may be attached to the electric vehicle 300A after the set of covers 340A is attached to the battery module mounting area 305A to form the battery housing.

Referring to FIG. 3A, a BJB 350A is mounted on top of the battery module mounting area 305A, and is electrically connected to the battery modules 310A-335A (and also the right-side battery modules, which are not shown explicitly in FIG. 3A) via a pipe or conduit 355A that contains high-voltage (HV) busbars which are coupled to the respective battery modules (e.g., via electrical interfaces or connectors that are sealed via an O-ring so that each battery module compartment remains sealed)

FIG. 3B illustrates example construction of a lateral-inserted battery module mounting area configuration in accordance with an embodiment of the disclosure. In FIG. 3B, the battery module mounting area 305A is shown as being constructed from a series of battery module compartment chambers 300B. Each battery module compartment chamber 300B is configured with a battery module compartment on each side as a paired battery module compartment arrangement, with each battery module compartment configured to receive a respective battery module. The battery module compartment chamber 300B includes a plurality of exterior walls that define an exterior frame of the battery module compartment chamber 300B, and at least one interior wall (not shown in FIG. 3B) that acts as a firewall between the respective battery module compartments of the battery module compartment chamber 300B and separates (and forms a seal with respect to) the respective battery module compartments. In particular, the at least one interior wall (or firewall) may help to fix the respective battery modules into a desired position upon insertion, to protect each respective battery module compartments from hazards in the other battery module compartment, guide crash forces, support connectors for LV and/or HV wiring and/or reduce a risk that the battery housing itself will collapse. In an example, the battery module compartment chamber 300B may include two interior walls in order to define a middle area (or tunnel space) that is sealed off from the respective battery module compartments. In alternative embodiments, the battery module compartment chamber 300B may include a single interior wall to seal the respective battery module compartments from each other without defining the tunnel space (e.g., such as in the scenario where the tunnel space is located above the battery housing). Further, in an example, each interior wall of the battery module compartment chamber 300B may be comprised of a single sheet of sheet metal or a sandwich of sheet metal.

Referring to FIG. 3B, an insertion-side (or opening) 303B is shown on one particular exterior-facing side of the battery module compartment chamber 300B. While not shown explicitly in FIG. 3B, an identical insertion-side is arranged on the opposing exterior-facing side of the battery module compartment chamber 300B. The respective insertion-sides are each configured to permit respective battery modules to be inserted into the respective interior spaces of the respective battery module compartments which are part of the battery module compartment chamber 300B. As will be described more with respect to FIG. 3B, each respective insertion-side of the battery module compartment chamber 300B is configured to be closed via respective lateral insertion-side covers so that each battery module compartment in the battery module compartment chamber 300B is sealed from the other battery module compartment. Because each battery module compartment chamber 300B may be stacked longitudinally with respect to the electric vehicle as shown at 320B, the two battery module compartments in each particular battery module compartment chamber 300B are considered to be laterally paired (e.g., left-side and right-side paired battery module compartments at the same longitudinal location along the battery module mounting area).

In FIG. 3B, holes 305B, 310B and 315B are configured over the tunnel space. In an example, the holes 305B and 315B may be configured to electrically couple HV busbars to the respective battery module compartments via HV connectors mounted into the respective holes, and the hole 310B may be configured to electrically couple to an LV busbar to the respective battery module compartments via an LV connector mounted into the hole 310B. As noted above, the LV busbar may be wired directly to the BJB, or alternatively may be wired to a wireless communications interface (e.g., an optical communications interface, such as an IR interface) configured to connect to a corresponding wireless communications interface coupled to the BJB. The respective battery module compartment chambers 300B may be connected (or stacked) side-by-side longitudinally in series (e.g., via welding, gluing, etc.) as shown at 320B to construct the battery module mounting area 305A. In an example, each battery module compartment chamber 300B may be independently constructed separate from the actual assembly of the battery module mounting area, and then attached together during the assembly to quickly assemble the battery module mounting area. As discussed below in more detail with respect to FIG. 6, the precise configuration of the battery module compartment chambers 300B is scalable (e.g., by varying a number of battery module compartment chambers 300B which are longitudinally stacked together based on a size requirement of the battery module mounting area, etc.) and may vary by implementation to accommodate different battery module mounting area sizing requirements.

The LV and HV connectors mounted into the top-holes 305B, 310B and 315B of the battery module compartment chamber 300B may be equipped with electrical coupling interfaces (e.g., LV/HV plugs or sockets) to the respective battery modules (as well as the LV/HV busbars) that are configured to be sealed with an O-ring (e.g., so that the respective battery module compartments are sealed while also protecting the tunnel space against hazards in the respective battery module compartments). The pipe 355A in FIG. 3A may carry the HV wiring that connects to the HV connectors to permit battery modules, upon insertion into a respective battery module compartment, to be coupled to the respective HV busbars. The pipe 355A may itself be sealed so that any HV wiring or busbars contained therein is not exposed.

Accordingly, when the battery modules are fully inserted into the respective battery module compartments of the battery module compartment chamber 300B, the battery module compartments are sealed off from each other (e.g., via walls, covers, and O-rings), while still being connected to both the LV and HV busbars. The sealing of the battery module compartments helps to protect against hazards (e.g., water, excessive heat or fire, gas, etc.) in one battery module compartment from spreading or propagating through the battery housing.

FIG. 3C illustrates an example of the battery module compartment chamber 300B of FIG. 3B in more detail in accordance with an embodiment of the disclosure. In FIG. 3C, the lateral opening at each battery module compartment of the battery module compartment chamber 300B may be sealed via a cover 300C. In alternative embodiments, a cover configured to seal multiple battery module compartments across different adjacent battery module compartment chambers 300B may be used, as discussed above. While the cover 300C in FIG. 3C is shown as an independent component, the cover 300C may alternatively be integrated with a respective battery module prior to installation into a battery module compartment of the battery module compartment chamber 300B.

Referring to FIG. 3C, an interior firewall 305C that seals a respective battery module compartment of the battery module compartment chamber 300B from the other battery module compartment and/or the tunnel space, and also forms part of the middle bar 210A, is shown by omitting a portion of the top-side of the battery module compartment chamber 300B from view. While not shown, in an example where the tunnel space is formed between the laterally adjacent battery module compartments (instead of being above the battery housing), another interior wall that seals the other battery module compartment from the tunnel space may also be part of the battery module compartment chamber 300B to define the gap for the tunnel space. A flange 310C and a set of integrated fixation points 315C for securing the cover 300C to the battery module compartment chamber 300B, and sealing the respective battery module compartment, are also shown in FIG. 3C. The cambers of battery module compartment chamber 300B are divided by the interior walls 305C.

FIG. 3D illustrates a battery housing reinforcement configuration 300D in accordance with an embodiment of the disclosure. Referring to FIG. 3D, once the battery module mounting area 305A is constructed, the battery module mounting area 305A may be reinforced with a bottom-mounted bar 305D (e.g., underneath the flange), a front-mounted bar 310D, a back-mounted bar 315D, side-mounted bars 320D-325D and a set of center-mounted bars 330D. The set of center-mounted bars 315 may be used to define a gap that is used as the tunnel space above the battery housing. FIG. 3E illustrates the battery housing reinforcement configuration 300D of FIG. 3D installed in an electric vehicle from a bottom-perspective in accordance with an embodiment of the disclosure. While only one bottom-mounted bar 305D is shown in FIG. 3D, it will be appreciated that the bottom-mounted bar 305D may be attached to each side of the battery module mounting area 305A as depicted in FIG. 3E.

The battery housing depicted in FIGS. 3A-3E may correspond to an example implementation of the battery housing 205A described above with respect to FIGS. 2A-2E, except that the battery housing depicted in FIGS. 3A-3E includes twelve battery module compartments (six on left side and six on right side) while the battery housing 205A in FIGS. 2A-2E includes ten battery module compartments (five on left side and five on right side). As described below in more detail, the sizes and number of battery module compartments can scale as needed for particular deployments (e.g., based on vehicle size, available battery module sizes, etc.).

Figure 4:
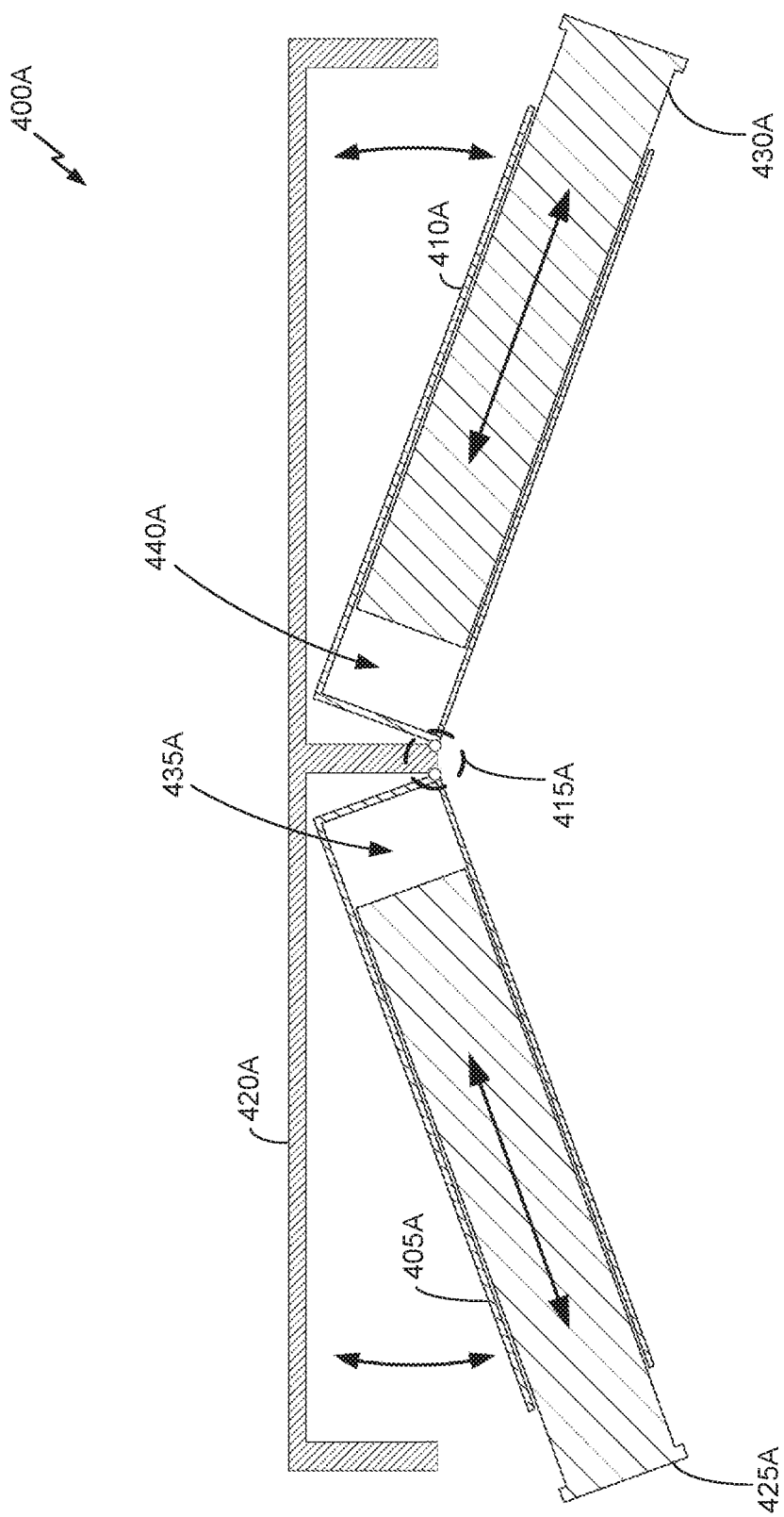
FIG. 4 illustrates a front-perspective or rear-perspective of a hinged-inserted battery module mounting area configuration for a battery housing of an electric vehicle in accordance with an embodiment of the disclosure.

FIG. 4 illustrates a front-perspective or rear-perspective of a hinged-inserted battery module mounting area configuration 400A for a battery housing of an electric vehicle in accordance with an embodiment of the disclosure. In FIG. 4, battery module compartments 405A and 410A on each side of the electric vehicle are attached to respective hinges 415A that are attached to vehicle structure 420A. The hinged-inserted battery module mounting area configuration 400A is depicted in an "open" state, whereby the battery module compartments 405A and 410A rotate freely via the respective hinges 415A. The battery module compartments 405A and 410A may be rotated downwards relative to the electric vehicle to a desired angle (e.g., while the electric vehicle is on a rack or lift where an underside of the electric vehicle may be accessed), at which point respective covers of the battery module compartments 405A and 410A can be removed to permit insertion and/or removal of respective battery modules 425A and 430A via the angled (or rotated) insertion-side of the respective battery module compartments 405A and 410A. When the battery modules 425A and 430A are not fully inserted (as shown in FIG. 4), gaps (or cavities) 435A and 440A are formed inside the battery module compartments 405A and 410A.

While FIG. 4 depict hinges 415A being centrally positioned so as to facilitate the battery module compartments 405A-410A rotate 'inwards' as shown in FIG. 4, alternative embodiments may be directed to hinges positioned at left and right exterior positions of the vehicle structure 420A to facilitate the battery module compartments 405A-410A to rotate 'outwards'. In this alternative embodiment, the insertion-side corresponds to the interior-facing lateral side of the respective battery module compartment, instead of the exterior-facing lateral side as depicted in FIG. 4. In a closed state, this alternative embodiment would be similar to FIG. 4 in a closed state, except for the location of the hinges.

Figure 5A:
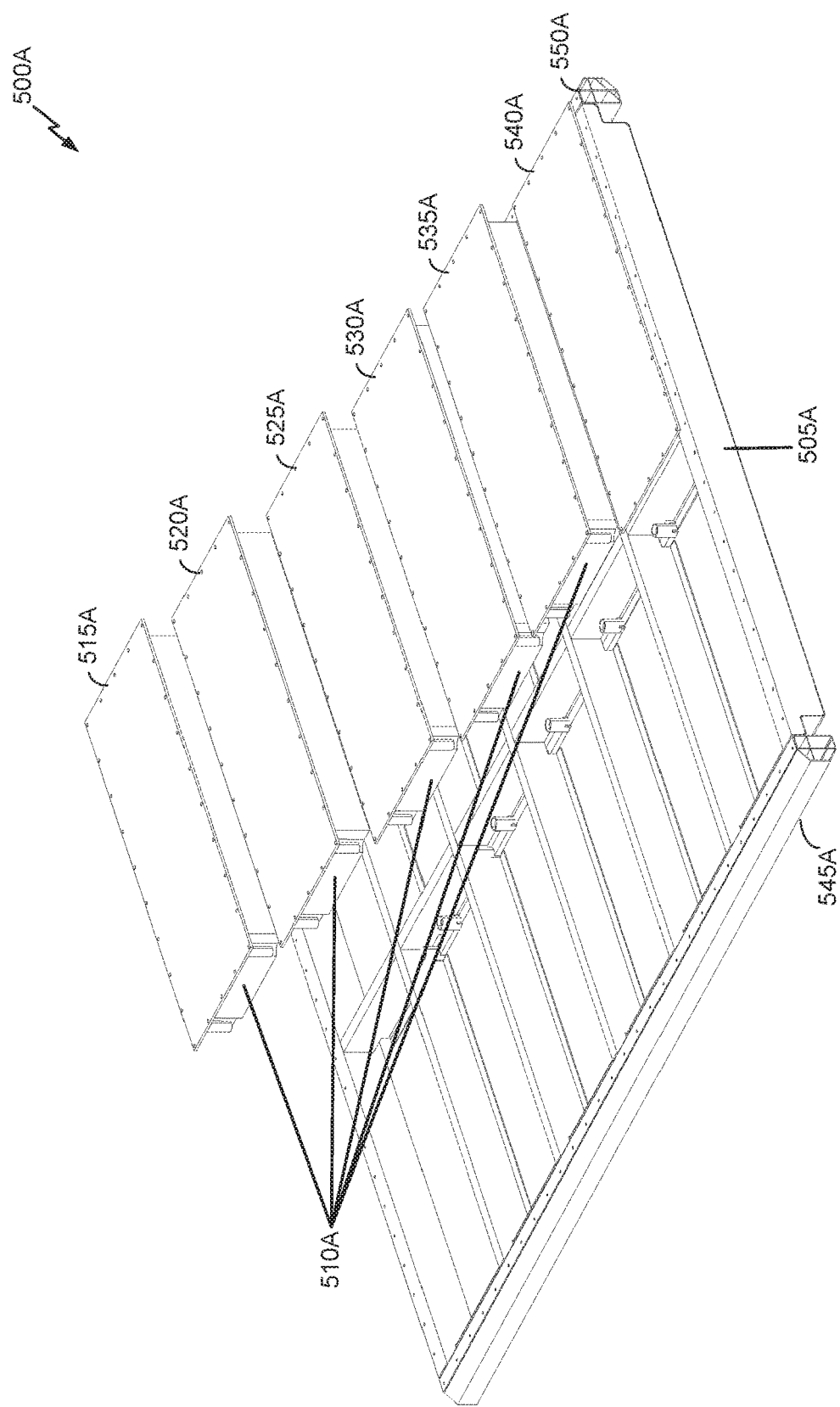
FIG. 5A illustrates a top-inserted battery module mounting area configuration for a battery housing of an electric vehicle in accordance with an embodiment of the disclosure.
Figure 5B:
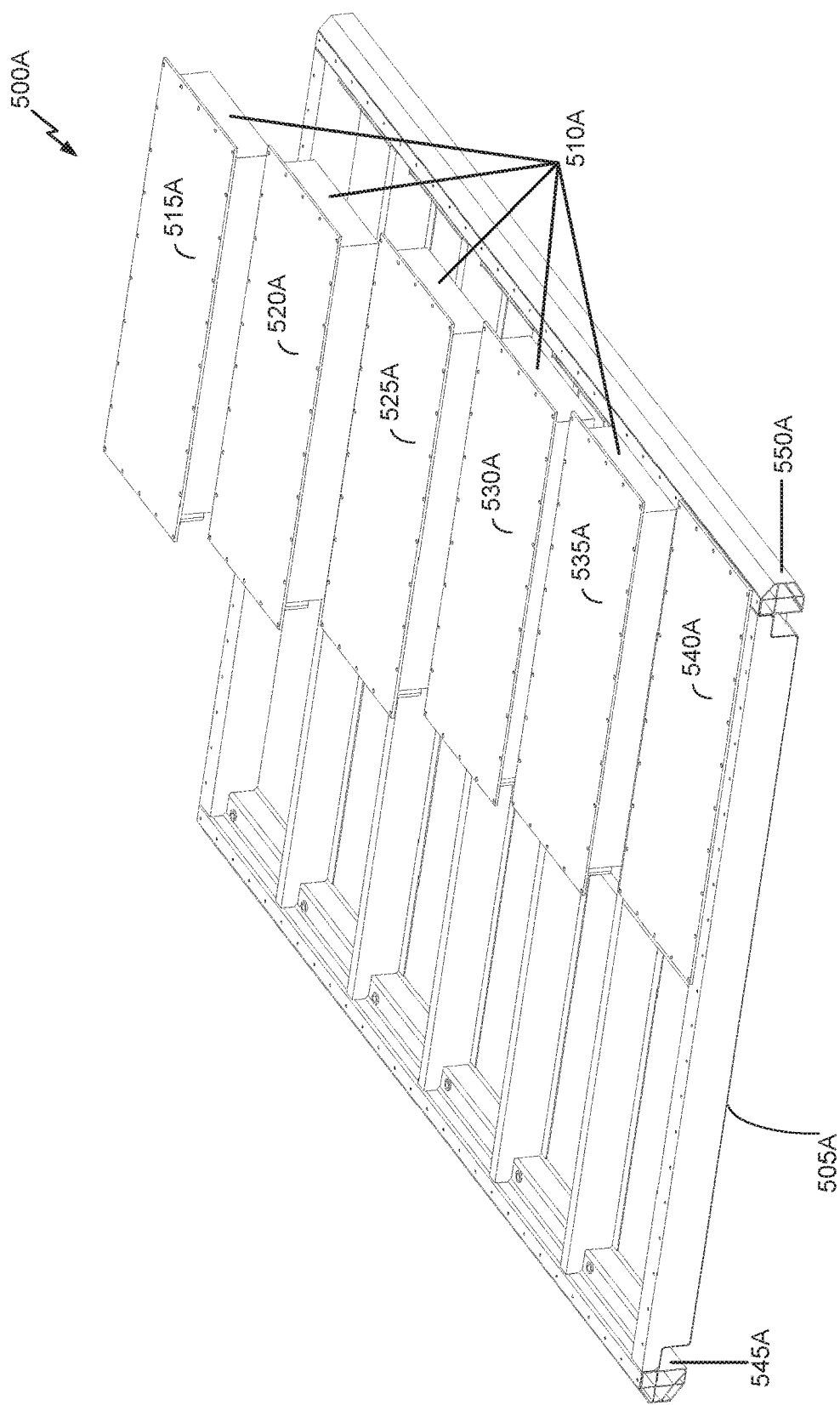
FIG. 5B illustrates the top-inserted battery module mounting area configuration of FIG. 5A from an alternative perspective in accordance with an embodiment of the disclosure.

FIG. 5A illustrates a top-inserted battery module mounting area configuration 500A for a battery housing of an electric vehicle in accordance with an embodiment of the disclosure. FIG. 5B illustrates the top-inserted battery module mounting area configuration 500A of FIG. 5A from an alternative perspective in accordance with an embodiment of the disclosure.

Figure 5C:
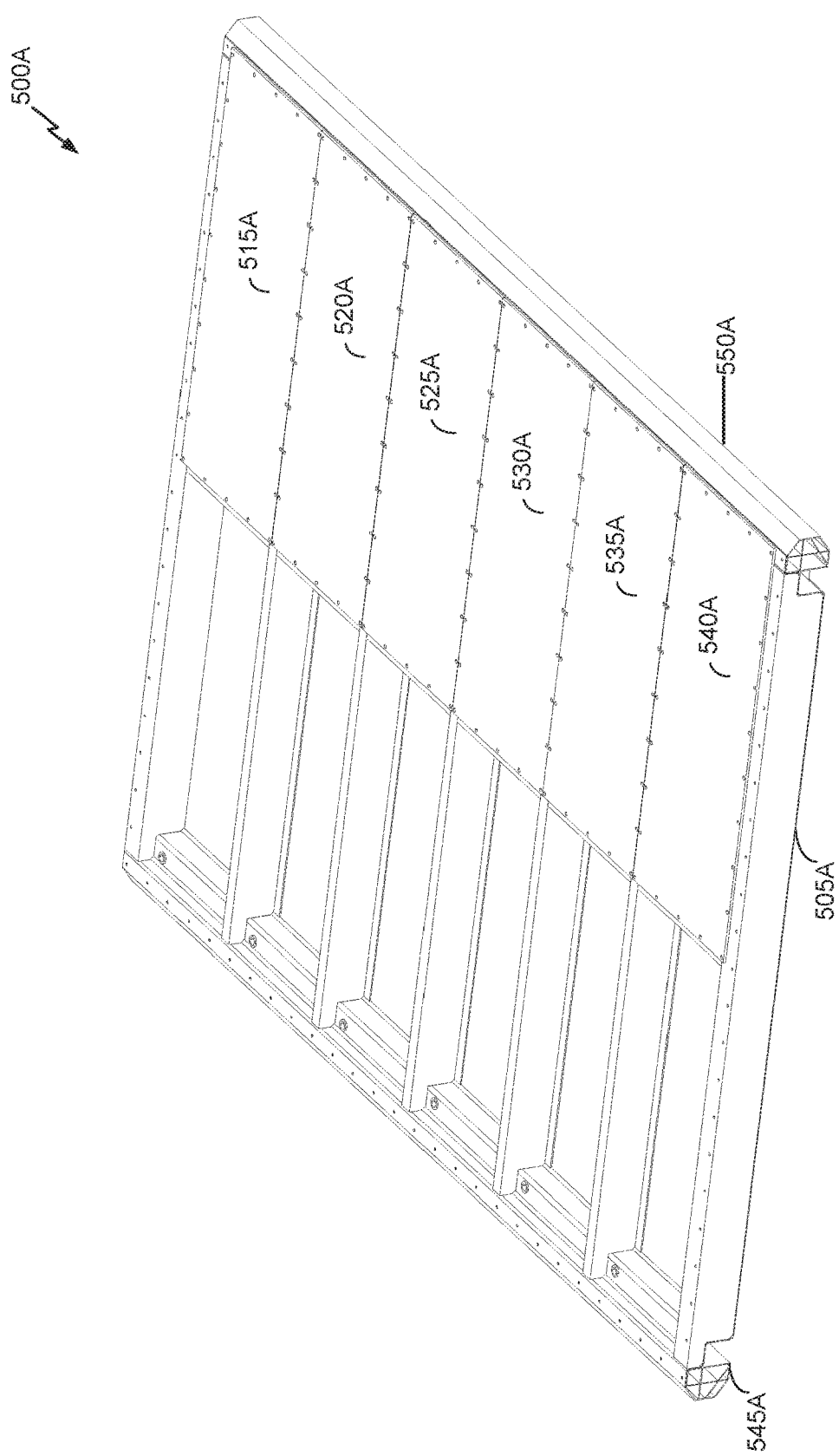
FIG. 5C illustrates the top-inserted battery module mounting area configuration of FIG. 5A from the alternative perspective as shown in FIG. 5B with each battery module compartment on the right-side of the battery module mounting area being sealed via top-covers in accordance with an embodiment of the disclosure.

Referring to FIGS. 5A-5B, the top-inserted battery module mounting area configuration 500A includes a battery module mounting area 505A with a plurality of battery module compartments that are each configured to receive, via top-insertion or vertical-insertion, a respective battery module. Upon insertion of a battery module, each battery module compartment may be sealed via a compartment-specific top-cover. As shown with respect to the right-side of the battery module mounting area 505A in FIG. 5A, battery modules 510A are shown at various degrees of insertion. The battery modules 510A are each configured to be sealed by one of the top-covers 515A-540A. Similar to the side-covers described above, in certain embodiments the top-covers 515A-540A may be physically integrated with corresponding battery modules prior to installation into the battery module mounting area 505A. Also, while illustrated as separate covers in FIG. 5A, certain top-covers may be implemented as "group" top-covers that may be physically integrated with multiple battery modules. Of course, the covers and battery modules could also be installed as separate components in other embodiments. While not shown expressly in FIG. 5A, battery modules and associated top-covers may similarly be inserted into battery module compartments on the left-side of the battery module mounting area 505A in FIG. 5A. FIG. 5C illustrates the top-inserted battery module mounting area configuration 500A of FIG. 5A from the alternative perspective as shown in FIG. 5B with each battery module compartment on the right-side of the battery module mounting area 505A being sealed via top-covers 535A-550A in accordance with an embodiment of the disclosure.

Referring to FIGS. 5A-5C, the top-covers 515A-540A may be secured to their respective battery modules in at least one embodiment (e.g., via welding, gluing, etc.). In an alternative embodiment, the battery modules and their respective top covers may be separate components (e.g., the battery module is inserted first, followed by its top-cover).

Also depicted in FIGS. 5A-5C are rocker panels 545A and 550A, which cover permanently sealed (or non-removable) side-walls of each respective battery module compartment. In other words, the side-covers depicted in FIGS. 3A-4B are removable while a top-section of each battery module compartment is permanent or fixed (e.g., via welding, etc.), while in FIGS. 5A-5C the side-section of each battery module compartment is fixed while the top-section (or top-cover) is removable.

Figure 5D:
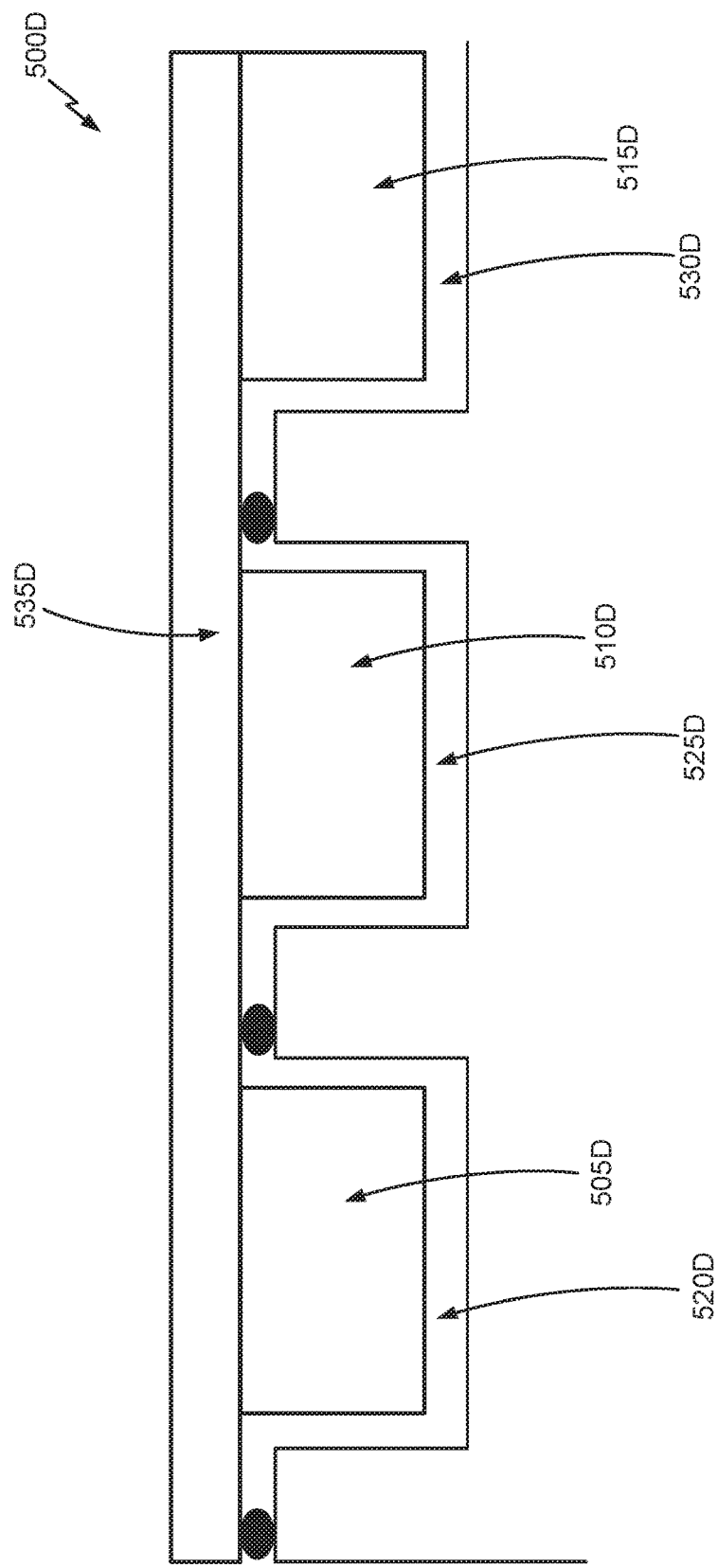
FIG. 5D illustrates a side-view of a portion of an alternative top-inserted (or Z-axis vertically inserted) battery module mounting area configuration for a battery housing of an electric vehicle in accordance with an embodiment of the disclosure.

FIG. 5D illustrates a side-view of a portion of an alternative top-inserted (or Z-axis vertically inserted) battery module mounting area configuration 500D for a battery housing of an electric vehicle in accordance with an embodiment of the disclosure. In FIGS. 5A-5C, each battery module compartment is individually sealed with its own compartment-specific top-cover, such that there is a 1:1 ratio between battery module compartments and top-covers. In FIG. 5D, battery modules 505D-515D are inserted in battery module compartments 520D-530D, respectively. The battery module compartments 520D-530D are sealed as a group via a single top-cover 535D, which may be physically integrated with the battery modules 505D-515D (e.g., multiple battery modules affixed to the same group top-cover) prior to installation into the battery housing. While not shown, the top-cover 535D may extend even further into the top-inserted battery module mounting area so as to seal one or more additional battery module compartments. Except for the ratio between battery module compartments and top-covers, the alternative top-inserted battery module mounting area configuration 500D of FIG. 5D is similar to the top-inserted battery module mounting area configuration 500A described above with respect to FIGS. 5A-5C. While FIG. 5D depicts an example where the top-cover 535D seals three (or more) battery module compartments, other embodiments may be directed to a top-cover configured to seal two battery module compartments, four battery module compartments, and so on. Generally, to improve structural strength and tolerances (e.g., resistance to torsion, to facilitate impact distribution that does not interfere with battery module operation, etc.), at least two top-covers will be deployed to seal the battery module compartments of a particular battery module mounting area.

Figure 5E:
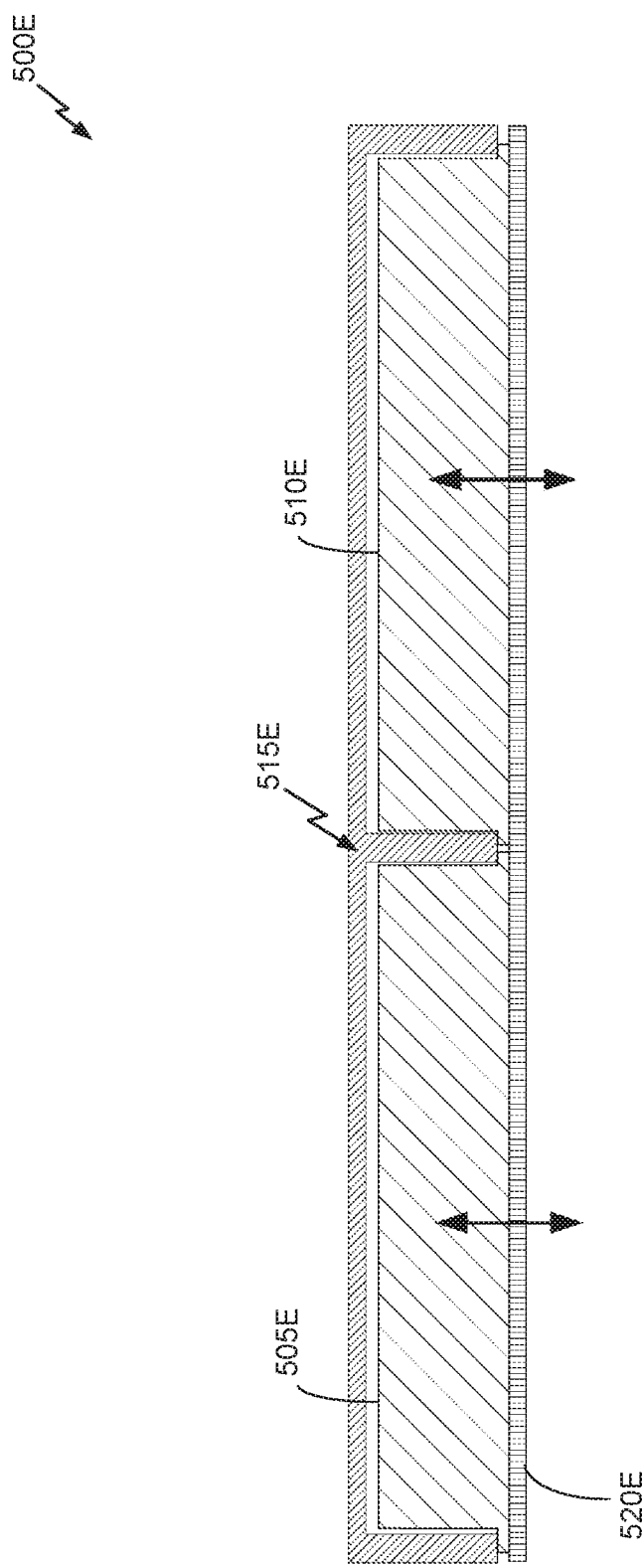
FIG. 5E illustrates a front-perspective or rear-perspective of a bottom-inserted battery module mounting area configuration for a battery housing of an electric vehicle in accordance with an embodiment of the disclosure.

FIG. 5E illustrates a front-perspective or rear-perspective of a bottom-inserted battery module mounting area configuration 500E for a battery housing of an electric vehicle in accordance with an embodiment of the disclosure. FIG. 5E is similar to FIG. 5D in some respects, in that the battery module mounting area configurations are each Z-axis vertically inserted that include a group cover. However, the battery module mounting area configuration 500D relates to a top-inserted battery module configuration whereas the battery module mounting area configuration 500E relates to a bottom-inserted battery module configuration Referring to FIG. 5E, battery modules 505E and 510E are shown as being inserted into a laterally adjacent pair of battery module compartments that are separated by an interior wall (or firewall) 515E. The respective battery module compartments containing the battery modules 505E and 510E are sealed as a group via a single bottom-cover 520E, which may be physically integrated with the battery modules 505E and 510E prior to installation into the battery housing. So, in one example, the battery modules 505E-510E and bottom-cover 520E may be pushed upwards (e.g., vertically along Z-axis) into the respective battery module compartments (and then secured/sealed). While not shown, the bottom-cover 520E may extend further longitudinally into the bottom-inserted battery module mounting area so as to seal one or more additional battery module compartments. Generally, to improve structural strength and tolerances (e.g., resistance to torsion, to facilitate impact distribution that does not interfere with battery module operation, etc.), at least two bottom-covers will be deployed to seal the battery module compartments of a particular battery module mounting area in accordance with the bottom-inserted battery module mounting area configuration 500E.

The battery module mounting area (or housing) configurations depicted in FIGS. 5A-5C may correspond to an example implementation of the battery module mounting area in battery housing 205A described above with respect to FIGS. 2A-2E, except that the battery module mounting area 500A depicted in FIGS. 5A-5C includes twelve battery module compartments (six on left side and six on right side) while the battery housing 205A in FIGS. 2A-2E includes ten battery module compartments (five on left side and five on right side). As described below in more detail, the sizes and number of battery module compartments can scale as needed for particular deployments (e.g., based on vehicle size, available battery module sizes, etc.).

Figure 6:
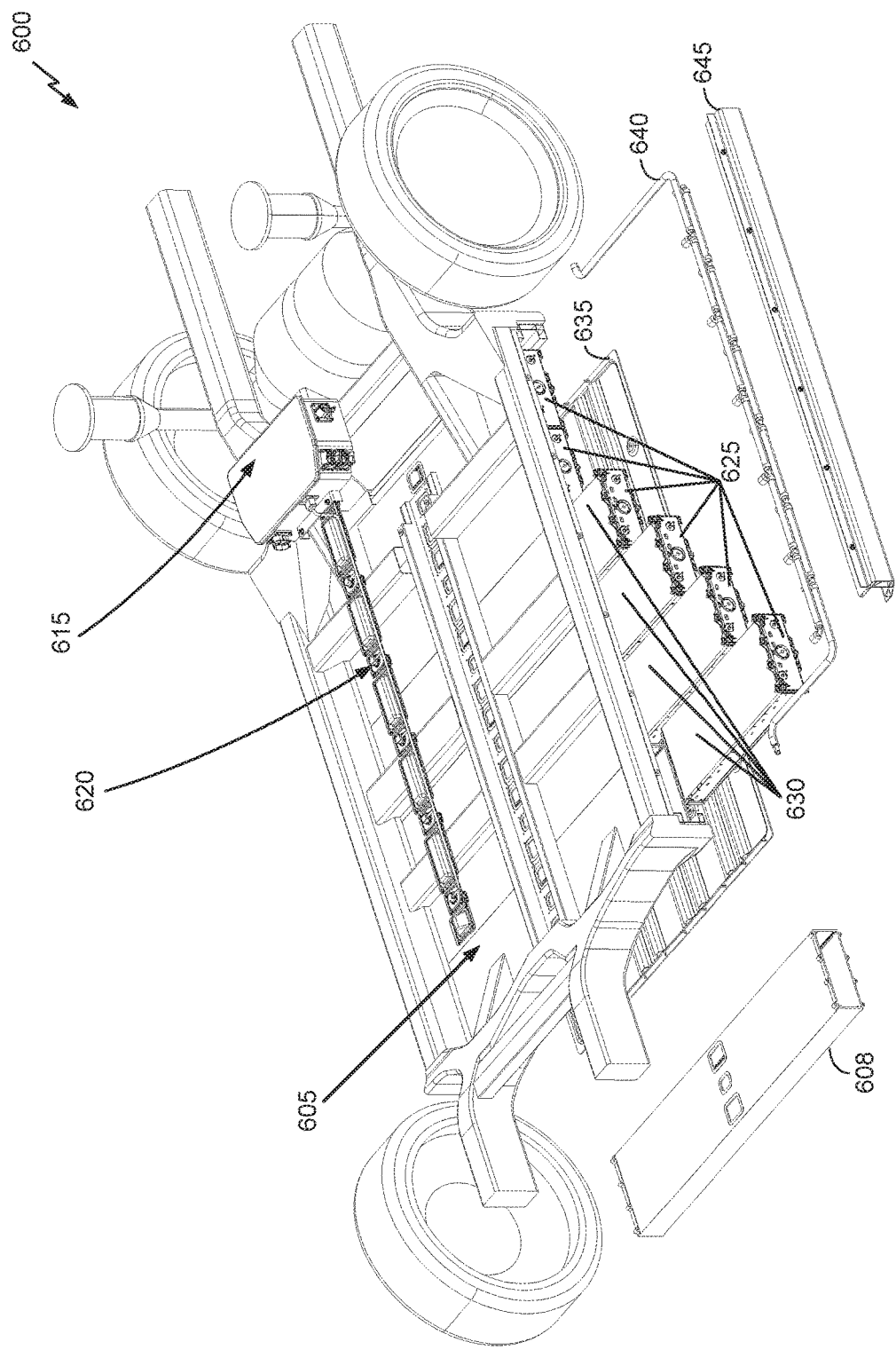
FIG. 6 illustrates battery housing components and related components of an electric vehicle in accordance with an embodiment of the disclosure.

FIG. 6 illustrates battery housing components and related components of an electric vehicle 600 in accordance with an embodiment of the disclosure. The battery housing depicted in FIG. 6 uses a lateral-inserted battery module mounting area configuration as described above with respect to FIGS. 3A-3E. In FIG. 6, a battery module mounting area 605 is depicted which includes a plurality of battery module compartments formed from battery module compartment chambers such as battery module compartment chamber 608 is depicted (e.g., similar to the battery module compartment chamber 300B described above with respect to FIG. 3B). A BJB 615 is mounted onto the battery module mounting area 605 and coupled to battery modules sealed inside the battery module compartments via a pipe 620 that includes an optional optical pathway for infrared (IR) or optical communication, LV wiring (or LV busbars), or a combination thereof. A set of side covers 625 (e.g., one per battery module compartment, or one per group of battery module compartments) is depicted, which may be used to seal the battery module compartments into which battery modules 630 are shown in various stages of lateral insertion. As noted above, one or more of the side covers in the set of side covers 625 may optionally be physically integrated with corresponding battery module(s) prior to installation into respective battery module compartment(s). An underride guard 635 may be attached to an underside of the battery module mounting area 605 to form part of a "sandwich" structure that secures the battery housing (once sealed). The underride guard 635 also functions to guide crash forces through the sandwich structure. A cooling manifold 640 may be coupled to sealed (e.g., via O-ring) cooling tube plug connectors formed on the set of side covers 625 to cool the battery modules. Finally, a removable rocker panel 645 is shown. In an example, the cooling manifold 640 may be located outside the respective battery module compartments so that no fittings or any other cooling tube connection is needed inside the respective battery module compartments (e.g., to reduce the risk of leakage because so that there need only be one metal tube inside each battery module compartment for cooling via a cooling plug connector attached via the respective side-cover).

Referring to FIG. 6, the size and configuration of the battery module mounting area 608 may be scaled up or down to accommodate wheel base dimensions of different vehicle types, as will be described in more detail below with respect to FIG. 7. For example, additional battery module compartment chambers 608 may be added or remove to increase or decrease a length of the overall battery module mounting area 605 (e.g., so as to accommodate a size requirement for a particular target wheel base). The width of the battery module compartment chambers 608 may also be increased or decreased to a desired width in order to correspondingly scale the width of the overall battery module mounting area 605. As will be appreciated, different electric vehicle model types (e.g., trucks, SUVs, minivans, sedans, sports coupes, etc.) may have different size requirements for respective battery module mounting areas, and the basic battery module mounting area configurations described in various embodiments of the disclosure can be scaled as needed to accommodate such size requirements. As will be appreciated, any change to the sizing of a battery module compartment will impact the sizing of a corresponding battery module inserted therein.

Figure 7:
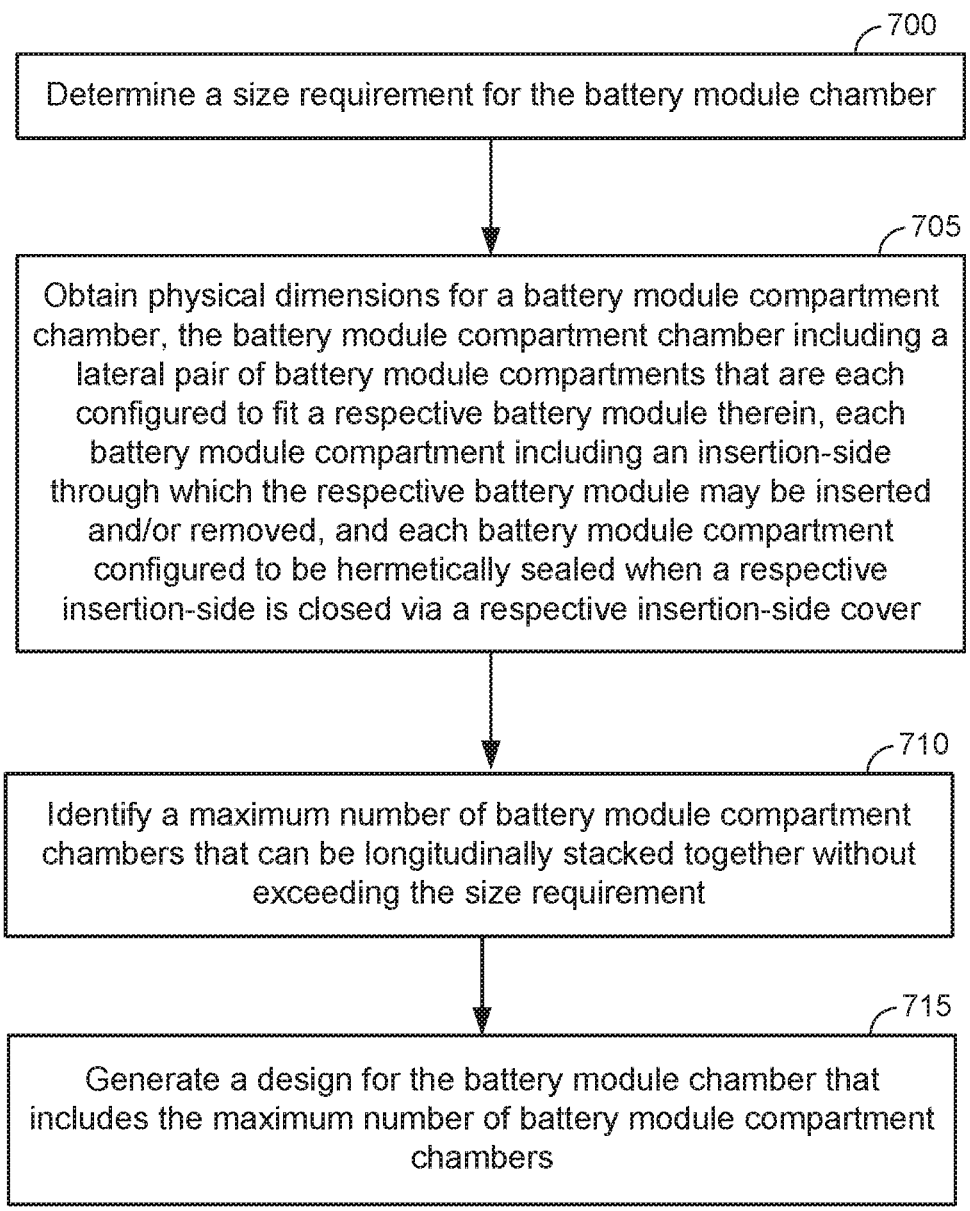
FIG. 7 illustrates a process of arranging (or designing) a battery module mounting area in accordance with an embodiment of the disclosure.

FIG. 7 illustrates a process of arranging (or designing) a battery module mounting area in accordance with an embodiment of the disclosure. In an example, the process of FIG. 7 may be executed to configure the battery module mounting area 605 depicted in FIG. 6. In an example, the process of FIG. 7 may be performed by a computing device (e.g., a laptop or desktop computer, a tablet computer, a smart phone or user equipment (UE), etc.).

Referring to FIG. 7, at 700, the computing device determines a size requirement for the battery module mounting area (e.g., for an electric vehicle implementation, the size requirement may be based in part upon an available amount of space beneath the floor of the electric vehicle). In an example, the size requirement may include size targets and/or thresholds (e.g., minimum and/or maximum thresholds) in multiple dimensions (e.g., height, length, width, etc.). The size requirement may be based on the physical configuration of a target electric vehicle (e.g., the wheel base of the electric vehicle, height of the electric vehicle underside where the battery module mounting area is deployed, a width of the electric vehicle, and so on).

Referring to FIG. 7, at 705, the computing device obtains physical dimensions (e.g., height, length and width) for a battery module compartment chamber, the battery module compartment chamber including a lateral pair of battery module compartments that are each configured to fit a respective battery module therein, each battery module compartment including an insertion-side through which the respective battery module may be inserted and/or removed, and each battery module compartment configured to be sealed when a respective insertion-side is closed via a respective insertion-side cover. The battery module compartment chamber for which physical dimensions are obtained at 705 may correspond to any of the battery module compartment chambers described above. In an example, at 705, the computing device may optionally obtain physical dimensions for two or more different types of battery module compartment chambers. For example, the two or more different types of battery module compartment chambers may be constructed with different physical dimensions to accommodate different size requirements for different electric vehicles. Alternatively, only a single stock (or default) battery module compartment chamber may be considered during the process of FIG. 7 (e.g., only one battery module compartment type available on market, a particular electric vehicle may be associated with a specific supplier of battery module compartment chamber so that only one option is available to use for that electric vehicle, etc.).

Referring to FIG. 7, at 710, the computing device identifies a maximum number of battery module compartment chambers that can longitudinally stacked together under the floor of the electric vehicle without exceeding the size requirement. For example, as shown in FIGS. 3A-3E, six battery module compartments can fit into the available space under the floor of the electric vehicle 300A, so the maximum number for electric vehicle 300A with respect to the battery module compartment chambers 300B is six. At 715, the computing device then generates, based on the identifying of 710, a design for the battery module mounting area that includes the maximum number of battery module compartment chambers.

In an example, if different types of battery module compartment chambers are under evaluation during the process of FIG. 7, the computing device may identify the maximum number of battery compartment chambers that can be longitudinally stacked together under the floor of the electric vehicle without exceeding the size requirement of the battery module mounting area for each particular battery module compartment chamber type at 710. Then, the computing device may determine, for each type of battery module compartment chamber, a spatial and/or energy efficiency metric that is based on that type's maximum number. In an example, the spatial efficiency metric may be based on a degree to which the maximum number of battery module compartment chambers satisfies the size requirement (e.g., 80% filled, 99% filled, etc.). In another example, the energy efficiency metric may be based on a power capacity of the battery modules that can be inserted into the maximum number of battery module compartment chambers. At 715, the computing device can select the battery module compartment type that is associated with the highest spatial and/or energy efficiency metric to use for the design of the battery module mounting area.

In another embodiment of the disclosure, less than all of the battery module compartments of a particular battery housing configuration may actually include battery modules. For example, a particular electric vehicle may be advertised for sale with a low-range option, an intermediate-range option and a high-range option. Assume that the battery housing configuration for all options is configured with twelve available battery module compartments. In an example, the low-range option may be equipped with six battery modules inserted among the twelve available battery module compartments, the intermediate-range option may be equipped with nine battery modules inserted among the twelve available battery module compartments, and the high-range option may be equipped with twelve battery modules inserted among the twelve available battery module compartments. Accordingly, the number of battery modules installed in a particular battery housing is scalable and need not be equivalent to the number of available battery module compartments. Further, the number of equipped battery modules can be modified after deployment (e.g., if an end-user needs more range, additional battery modules can be purchased and installed). Further, one or more of the battery modules can be swapped out for newer, more efficient battery modules as battery module technology improves.

Moreover, if less than all of the battery module compartments of a particular battery housing configuration may actually include battery module, in at least one embodiment, the battery module compartments containing battery modules may be clustered together. For example, consider the arrangement of battery module compartments A . . . J in FIG. 2A. Assume that the BJB is positioned above battery module compartments E and J, and that only 8 battery modules are required for installation into the electric vehicle 200A. In this case, battery module compartments A and F (i.e., the battery module compartments furthest away from the BJB) may be left empty (although these battery module compartments may still be covered), with battery modules installed into battery module compartments B . . . E and G . . . J only. The HV wiring may be daisy-chained (in order) from the BJB to battery modules in battery module compartments J, I, H, G, B, C, D and E, with battery module compartments A and F being bypassed by virtue of the HV output connector in battery module compartment G being coupled to the HV input connector in battery module compartment B (e.g., using a special paired HV connector component that connects laterally adjacent battery module compartments instead of longitudinally adjacent battery module compartments).

With respect to each of the embodiments described above with respect to FIGS. 2A-7, a battery module may be constructed with or without the respective insertion-side cover that is used seal the associated battery module compartment being integrated as a structural component of the battery module itself. In an example where a battery module is integrated with its respective insertion-side cover, the insertion-side cover doubles as a structural wall of the battery module. In an alternative example where a battery module is not integrated with its respective insertion-side cover, the insertion-side cover will be installed over a structural wall of the battery module when sealing the battery module into the battery module compartment.

While the embodiments described above relate primarily to land-based electric vehicles (e.g., cars, trucks, etc.), it will be appreciated that other embodiments can deploy the various battery-related embodiments with respect to any type of electric vehicle (e.g., boats, submarines, airplanes, helicopters, drones, spaceships, space shuttles, rockets, etc.).

While the embodiments described above relate primarily to battery module compartments and associated battery modules and insertion-side covers for deployment as part of an energy storage system for an electric vehicle, it will be appreciated that other embodiments can deploy the various battery-related embodiments with respect to any type of energy storage system. For example, besides electric vehicles, the above-noted embodiments can be applied to energy storage systems such as home energy storage systems (e.g., providing power storage for a home power system), industrial or commercial energy storage systems (e.g., providing power storage for a commercial or industrial power system), a grid energy storage system (e.g., providing power storage for a public power system, or power grid) and so on.

As will be appreciated, the placement of the various battery module compartments in the above-noted embodiments is described as being integrated into a vehicle floor of an electric vehicle. However, it will be appreciated that the general closed compartment profile design may be extended to battery module mounting areas that can be installed in other locations within the electric vehicle (e.g., in a trunk of the electric vehicle, behind one or more car seats, under a front-hood of the electric vehicle, etc.).

The forgoing description is provided to enable any person skilled in the art to make or use embodiments of the invention. It will be appreciated, however, that the invention is not limited to the particular formulations, process steps, and materials disclosed herein, as various modifications to these embodiments will be readily apparent to those skilled in the art. That is, the generic principles defined herein may be applied to other embodiments without departing from the spirit or scope of the embodiments of the invention.

The invention claimed is:

1. A battery module mounting area of an energy storage system for an electric vehicle, comprising:
    a first set of battery module compartments arranged along a first longitudinal side of the battery module mounting area; and
    a second set of battery module compartments arranged along a second longitudinal side of the battery module mounting area,
    wherein each battery module compartment in the first and second sets of battery module compartments includes an insertion-side through which a battery module is configured to be inserted into the battery module compartment and/or removed from the battery module compartment,
    wherein the insertion-side of each battery module compartment in the first and second sets of battery module compartments is exterior-facing relative to the electric vehicle and is configured to permit direct access from outside the electric vehicle for the insertion of the battery module into the battery module compartment and/or the removal of the battery module from the battery module compartment while the battery module mounting area remains integrated as part of the electric vehicle, wherein the insertion-side of each battery module compartment in the first and second sets of battery module compartments is configured to be closed via an insertion-side cover to form a battery housing with a closed compartment profile that is characterized by each battery module compartment being sealed from at least one other battery module compartment in the battery housing.

2. The battery module mounting area of claim 1, wherein, for each battery module compartment in the first and second sets of battery module compartments, the insertion-side corresponds to a lateral side of the battery module compartment.

3. The battery module mounting area of claim 2, wherein, for each battery module compartment in the first and second sets of battery module compartments, the lateral side corresponds to an exterior-facing lateral side of the battery module compartment.

4. The battery module mounting area of claim 3,
wherein, for each battery module compartment in the first set of battery module compartments, the insertion-side corresponds to a first longitudinally lateral side of the battery module compartment, and
wherein, for each battery module compartment in the second set of battery module compartments, the insertion-side corresponds to a second longitudinally lateral side of the battery module compartment.

5. The battery module mounting area of claim 2, wherein, for each battery module compartment in the first and second sets of battery module compartments, the battery module is configured to be laterally inserted into the battery module compartment and/or laterally removed from the battery module compartment.

6. The battery module mounting area of claim 1, wherein each battery module compartment in the first and second sets of battery module compartments is attached to a hinge that permits the battery module compartment to be configured in a closed state where insertion and/or removal of the battery module is not permitted or an open state where the battery module compartment is configured to rotate downwards to permit insertion and/or removal of the battery module via the insertion-side of the battery module compartment.

7. The battery module mounting area of claim 1, wherein, for each battery module compartment in the first and second sets of battery module compartments, the insertion-side corresponds to a bottom-side of the battery module compartment.

8. The battery module mounting area of claim 1, wherein each battery module compartment in the first and second sets of battery module compartments includes a compartment-specific insertion-side cover that is configured to individually cover the battery module compartment.

9. The battery module mounting area of claim 1, wherein at least one insertion-side cover is configured to cover a group of battery module compartments among the first set of battery module compartments or the second set of battery module compartments, such that the group of battery module compartments is sealed from one or more adjacent battery module compartments outside of the group of battery module compartments.

10. The battery module mounting area of claim 1, wherein each battery module compartment in the first set of battery module compartments is paired laterally with a battery module compartment from the second set of battery module compartments.

11. The battery module mounting area of claim 10, wherein a tunnel space extends longitudinally along a center of the battery module mounting area.

12. The battery module mounting area of claim 11, wherein the tunnel space is positioned above the battery module mounting area.

13. The battery module mounting area of claim 11,
wherein a battery junction box (BJB) is mounted on top of the battery module mounting area, and
wherein busbars carrying low-voltage (LV) and/or high-voltage (HV) wiring are run along the tunnel space between the BJB and one or more electrical coupling interfaces at each battery module compartment in the first and second sets of battery module compartments for coupling to respective battery modules contained therein.

14. The battery module mounting area of claim 13, wherein the one or more electrical coupling interfaces at each battery module compartment in the first and second sets of battery module compartments are sealed.

15. The battery module mounting area of claim 10, wherein each battery module compartment pair is part of a battery module compartment chamber that is independently constructed from each other battery module compartment chamber.

16. The battery module mounting area of claim 15, wherein the battery module mounting area includes a plurality of battery module compartment chambers that are secured to each other during assembly of the battery module mounting area.

17. The battery module mounting area of claim 16, wherein a size of the battery module mounting area is scalable based at least in part on a number of battery module compartment chambers included within the battery module mounting area.

18. The battery module mounting area of claim 1, wherein the first and second sets of battery module compartments are constructed from sheet metal or die-cast aluminum.

19. The battery module mounting area of claim 1, further comprising:
a middle bar arranged longitudinally along or proximate to a lateral center of the battery module mounting area,
wherein the middle bar divides the first set of battery module compartments from the second set of battery module compartments and is configured to structurally reinforce the battery module mounting area.

20. A battery module mounting area of an energy storage system for an electric vehicle, comprising:
a first set of battery module compartments arranged along a first longitudinal side of the battery module mounting area; and
a second set of battery module compartments arranged along a second longitudinal side of the battery module mounting area; and
a middle bar arranged longitudinally along or proximate to a lateral center of the battery module mounting area,
wherein each battery module compartment in the first and second sets of battery module compartments includes an insertion-side through which a battery module is configured to be inserted into the battery module compartment and/or removed from the battery module compartment wherein the insertion-side of each battery module compartment in the first and second sets of battery module compartments is exterior-facing relative to the electric vehicle and is configured to permit direct access from outside the electric vehicle for the insertion of the battery module into the battery module compartment and/or the removal of the battery module from the battery module compartment while the battery module mounting area remains integrated as part of the electric vehicle, wherein the insertion-side of each battery module compartment in the first and second sets of battery module compartments is configured to be closed via an insertion-side cover to form a battery housing with a closed compartment profile that is characterized by each battery module compartment being sealed from at least one other battery module compartment in the battery housing, wherein the middle bar divides the first set of battery module compartments from the second set of battery module compartments and is configured to structurally reinforce the battery module mounting area, and wherein the middle bar is a single bar that extends across the battery module mounting area, or wherein the middle bar is an aggregation of independently constructed interior firewalls, each of the independently constructed interior firewalls being positioned between a pair of laterally adjacent battery module compartments from the first and second sets of battery module compartments.

21. The battery module mounting area of claim 1, wherein one or more reinforcement structures are attached to the battery housing.

22. The battery module mounting area of claim 21, wherein the one or more reinforcement structures include:
   a bottom-mounted bar, a front-mounted bar, a back-mounted bar, one or more side-mounted bars, a set of center-mounted bars, an underride guard or any combination thereof.

23. The battery module mounting area of claim 1, wherein the battery module mounting area is permanently or irremovably integrated into a chassis of the electric vehicle.

24. The battery module mounting area of claim 1, wherein the battery module mounting area is attached to a chassis of the electric vehicle without being permanently or irremovably integrated into the chassis.

25. The battery module mounting area of claim 1, wherein the seal between each battery module compartment and the at least one other battery module compartment in the battery housing is at least liquid-tight.

26. The battery module mounting area of claim 25, wherein the seal between each battery module compartment and the at least one other battery module compartment in the battery housing is liquid tight and gas-tight with respect to one or more types of gas.

* * * * *